United States Patent
Nishioka et al.

(10) Patent No.: US 12,030,987 B2
(45) Date of Patent: Jul. 9, 2024

(54) ALIPHATIC POLYCARBONATE

(71) Applicants: SUMITOMO SEIKA CHEMICALS CO., LTD., Hyogo (JP); MURATA MANUFACTURING CO., LTD., Nagaokakyo (JP)

(72) Inventors: Kiyoshi Nishioka, Himeji (JP); Yusuke Ueba, Nagaokakyo (JP); Akemi Kirihata, Nagaokakyo (JP)

(73) Assignees: SUMITOMO SEIKA CHEMICALS CO., LTD., Hyogo (JP); MURATA MANUFACTURING CO., LTD., Nagaokakyo (JP)

( * ) Notice: Subject to any disclaimer, the term of this patent is extended or adjusted under 35 U.S.C. 154(b) by 523 days.

(21) Appl. No.: 17/425,474

(22) PCT Filed: Jan. 21, 2020

(86) PCT No.: PCT/JP2020/001854
§ 371 (c)(1),
(2) Date: Jul. 23, 2021

(87) PCT Pub. No.: WO2020/153329
PCT Pub. Date: Jul. 30, 2020

(65) Prior Publication Data
US 2022/0098364 A1  Mar. 31, 2022

(30) Foreign Application Priority Data
Jan. 24, 2019 (JP) .................................. 2019-010018

(51) Int. Cl.
*C08G 64/02* (2006.01)
*C08G 64/40* (2006.01)
(Continued)

(52) U.S. Cl.
CPC ......... *C08G 64/0216* (2013.01); *C08G 64/40* (2013.01); *C09D 11/102* (2013.01); *C09D 169/00* (2013.01); *C09J 169/00* (2013.01)

(58) Field of Classification Search
CPC ..... C09D 11/102; C09D 169/00; C09J 169/00
(Continued)

(56) References Cited

U.S. PATENT DOCUMENTS

| 2012/0053282 A1 | 3/2012 | Shimizu et al. |
| 2018/0030203 A1* | 2/2018 | Nakano .................. C08G 64/34 |

(Continued)

FOREIGN PATENT DOCUMENTS

| CN | 107446122 A | 12/2017 |
| CN | 108276569 A | 7/2018 |

(Continued)

OTHER PUBLICATIONS

Jeannette Geschwind et al., "Poly(1,2-glycerol carbonate): A Fundamental Polymer Structure Synthesized from CO2 and Glycidyl Ethers", Macromolecules, 2013, pp. 3280-3287, vol. 46, No. 9.
(Continued)

*Primary Examiner* — Deve V Hall
(74) *Attorney, Agent, or Firm* — Sughrue Mion, PLLC

(57) ABSTRACT

An object of this invention is to find a method for introducing a functional group into an aliphatic polycarbonate without impairing the excellent thermal decomposition property of the aliphatic polycarbonate.
An aliphatic polycarbonate comprising a constituent unit represented by formula (1):

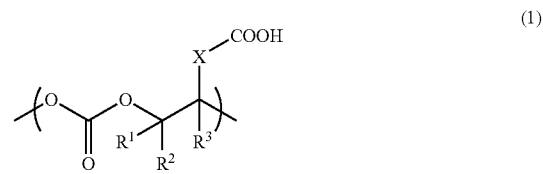

wherein $R^1$, $R^2$, and $R^3$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^1$ to $R^3$, taken together with the carbon atom or carbon atoms to which these groups are attached, may form a substituted or unsubstituted, saturated or unsaturated 3- to 10-membered aliphatic ring; and X represents a divalent group containing one or more heteroatoms or an alkylene group having 3 or more carbon atoms, and
a constituent unit represented by formula (2):

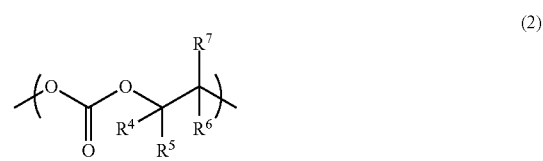

wherein $R^4$, $R^5$, $R^6$, and $R^7$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^4$ to $R^7$, taken together with the carbon atom or carbon atoms to which these groups are attached, may form a substituted or unsubstituted, saturated or unsaturated 3- to 10-membered aliphatic ring,
   the content of the constituent unit represented by formula (1) being 0.1 mol % or more and 1.5 mol % or less, based on the total amount of the constituent units of formula (1) and formula (2).

16 Claims, 2 Drawing Sheets

(51) Int. Cl.
*C09D 11/102* (2014.01)
*C09D 169/00* (2006.01)
*C09J 169/00* (2006.01)

(58) Field of Classification Search
USPC .......................................................... 524/596
See application file for complete search history.

(56) References Cited

U.S. PATENT DOCUMENTS

| 2018/0298251 | A1 | 10/2018 | Miyazaki et al. |
| 2019/0136046 | A1 | 5/2019 | Nakano et al. |
| 2019/0256651 | A1 | 8/2019 | Nakano et al. |
| 2020/0048504 | A1 | 2/2020 | Sugo et al. |

FOREIGN PATENT DOCUMENTS

| JP | 5-123891 A | 5/1993 | |
| JP | 2011-20916 A | 2/2011 | |
| JP | 2013-536310 A | 9/2013 | |
| JP | 2014-55232 A | 3/2014 | |
| KR | 10-2018-0005711 A | 1/2018 | |
| TW | 201900802 A | 1/2019 | |
| WO | 2010/053110 A1 | 5/2010 | |
| WO | 2012/027725 A1 | 3/2012 | |
| WO | 2012/091327 A2 | 7/2012 | |
| WO | 2016/139831 A1 | 9/2016 | |
| WO | WO-2016139831 A1 * | 9/2016 | ............ C08G 64/02 |
| WO | 2017/170079 A1 | 10/2017 | |
| WO | 2018/008662 A1 | 1/2018 | |

OTHER PUBLICATIONS

Pengfei Song et Synthesis and characterization of aminofunctionalized poly(propylene carbonate), RSC Advances, 2015, pp. 32092-32095, vol. 5.

Fengxiang Gao et al., "Chain Extension of Maleic Anhydride End-Capped Poly (1,2-Cyclohexylene Carbonate) by Bisoxazolines", Acta Polymerica Sinica, 2011, pp. 772-777, vol. 7.

International Search Report for PCT/JP2020/001854 dated Apr. 14, 2020 (PCT/ISA/210).

Office Action dated Nov. 21, 2023 in Korean Application No. 10-2021-7022744.

* cited by examiner

ALIPHATIC POLYCARBONATE

CROSS REFERENCE TO RELATED APPLICATIONS

This application is a National Stage of International Application No. PCT/JP2020/001854 filed Jan. 21, 2020, claiming priority based on Japanese Patent Application No. 2019-010018 filed Jan. 24, 2019.

TECHNICAL FIELD

The present disclosure relates to an aliphatic polycarbonate, an aliphatic polycarbonate composition comprising the aliphatic polycarbonate, and the like. The contents of all of the documents described herein are incorporated herein by reference.

BACKGROUND ART

In recent years, there has been a growing trend to replace the raw materials of various industrial products with non-petroleum-derived materials. For example, regarding polyethylene, which is a typical petroleum-derived plastic, so-called bio-polyethylene, which is produced from ethylene made from ethanol obtained by the fermentation of biomass, is commercially available. In the midst of such a trend, the direct use of carbon dioxide as an industrial raw material has been actively studied, and some products are actually being produced. Among these, aliphatic polycarbonates produced by copolymerization of an epoxide and carbon dioxide have been studied for a long time. Since these aliphatic polycarbonates have characteristics that are not found in conventional synthetic resins, various applications thereof have been studied.

Aliphatic polycarbonates have been considered for use as an environmentally friendly material because they use carbon dioxide as a raw material. For example, Patent Literature (PTL) 1 discloses a composition obtained by combining an aliphatic polycarbonate with a methacrylic resin and vinyl resin. PTL 2 discloses a hot-melt adhesive composition containing an aliphatic polycarbonate as a main component.

In addition, applications have been actively developed that take advantage of the characteristics of aliphatic polycarbonates, which are thermally decomposed at low temperatures under both an air atmosphere and an inert atmosphere, leaving almost no residue. For example, PTL 3 discloses a solder paste composition using an aliphatic polycarbonate as a binder. PTL 4 discloses a method for producing a ceramic sintered body using an aliphatic polycarbonate as a binder. PTL 5 discloses a metal paste composition using an aliphatic polycarbonate as a binder.

Further, since aliphatic polycarbonates are produced by copolymerization of an epoxide and carbon dioxide, the only sites that can react or interact with other materials are at the carbonate groups or polymer chain ends. Since the carbonate groups are interacting weakly, and the polymer chain ends account for a small proportion of the total, aliphatic polycarbonates have weak affinity for other materials, which may limit the materials to which they can be applied. Therefore, attempts have been made to introduce functional groups into aliphatic polycarbonates. For example, Non-patent Literature (NPL) 1 discloses an aliphatic polycarbonate containing a hydroxy group introduced in a side chain. NPL 2 discloses an aliphatic polycarbonate containing an amino group introduced in a side chain. NPL 3 discloses an aliphatic polycarbonate containing a carboxy group introduced at a polymer chain end.

CITATION LIST

Patent Literature

PTL 1: WO2010/053110
PTL 2: WO2012/091327
PTL 3: JPH5-123891A
PTL 4: JP2011-020916A
PTL 5: JP2014-055232A

Non-Patent Literature

NPL 1: Jeannette Geschwind and Holger Frey, "Macromolecules," 2013, vol. 46, no. 9, p. 3280-3287
NPL 2: Pengfei Song, Yingqi Shang, Siying Chong, Xiaogang Zhu, Haidong Xu, and Yubing Xiong, "RSC Advances," 2015, vol. 5, p. 32092-32095
NPL 3: Gao Fengxiang, Zhou Qinghai, Qin Yusheng, Wang Xianhong, Zhao Xiaojiang, and Wang Fosong, "Acta Polymerica Sinica," 2011 (7), p. 772-777

SUMMARY OF INVENTION

Technical Problem

The present inventors found that the introduction of a functional group often impairs the excellent original characteristics of aliphatic polycarbonates (e.g., almost no residue remaining after thermal decomposition).

The inventors investigated whether a functional group can be introduced into an aliphatic polycarbonate without impairing the excellent thermal decomposition property of the aliphatic polycarbonate.

Solution to Problem

The present inventors found that in an aliphatic polycarbonate with a specific structure, the excellent thermal decomposition property of the aliphatic polycarbonate is not easily impaired while the aliphatic polycarbonate has a functional group in a side chain. The inventors conducted further research in this regard.

The present disclosure encompasses, for example, the subject matter of the following items.

Item 1.

An aliphatic polycarbonate comprising a constituent unit represented by formula (1):

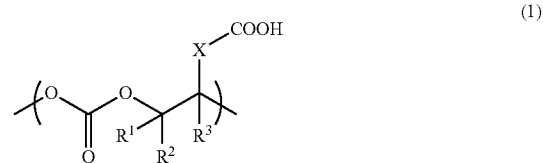

wherein $R^1$, $R^2$, and $R^3$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^1$ to $R^3$, taken together with the carbon atom or carbon atoms to which these groups are attached, may form a substituted or unsubstituted, saturated or unsaturated 3- to 10-membered aliphatic ring; and X represents a divalent group containing one or more heteroatoms or an alkylene group having 3 or more carbon atoms, and
a constituent unit represented by formula (2):

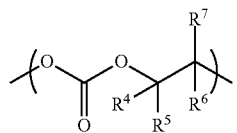

(2)

wherein $R^4$, $R^5$, $R^6$, and $R^7$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^4$ to $R^7$, taken together with the carbon atom or carbon atoms to which these groups are attached, may form a substituted or unsubstituted, saturated or unsaturated 3- to 10-membered aliphatic ring,
the content of the constituent unit represented by formula (1) being 0.1 mol % or more and 1.5 mol % or less, based on the total amount of the constituent units of formula (1) and formula (2).

Item 2.

The aliphatic polycarbonate according to Item 1, which has a mass average molecular weight of 60000 or more and 1000000 or less.

Item 3.

The aliphatic polycarbonate according to Item 1 or 2, wherein the divalent group containing one or more heteroatoms represented by X in formula (1) is a group containing at least one atom selected from the group consisting of an oxygen atom, a nitrogen atom, and a sulfur atom.

Item 4

The aliphatic polycarbonate according to Item 1 or 2, wherein the divalent group containing one or more heteroatoms represented by X in formula (1) is a group represented by formula (a):

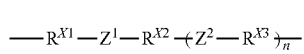

(a)

wherein $R^{X1}$, $R^{X2}$, and $R^{X3}$ are identical or different, and each represents a single bond, a $C_{1-6}$ linear or branched alkylene group, or —$C_6H_4$—; $Z^1$ and $Z^2$ are identical or different, and each represents an ether linkage, an ester linkage, an amino linkage, an amide linkage, a sulfide linkage, or a thioester linkage; and n represents 0 or 1.

Item 5.

The aliphatic polycarbonate according to any one of Items 1 to 4, which consists of the constituent unit represented by formula (1) and the constituent unit represented by formula (2).

Item 6.

An aliphatic polycarbonate composition comprising the aliphatic polycarbonate according to any one of Items 1 to 5 and a crosslinking agent.

Item 7.

An adhesive composition obtained by using the aliphatic polycarbonate according to any one of Items 1 to 5 or the aliphatic polycarbonate composition according to Item 6.

Item 8.

An ink composition comprising the aliphatic polycarbonate according to any one of Items 1 to 5 or the aliphatic polycarbonate composition according to Item 6.

Item 9.

A coating composition comprising the aliphatic polycarbonate according to any one of Items 1 to 5 or the aliphatic polycarbonate composition according to Item 6.

Item 10.

A binder for sintering, comprising the aliphatic polycarbonate according to any one of Items 1 to 5 or the aliphatic polycarbonate composition according to Item 6.

Item 11.

A dispersant comprising the aliphatic polycarbonate according to any one of Items 1 to 5 or the aliphatic polycarbonate composition according to Item 6.

Advantageous Effects of Invention

The aliphatic polycarbonate encompassed by the present disclosure has the excellent thermal decomposition property of the aliphatic polycarbonate, while having a functional group in a side chain. Accordingly, the aliphatic polycarbonate has the excellent thermal decomposition property of conventional aliphatic polycarbonates, and also has improved reactivity with and affinity for other materials; thus, the aliphatic polycarbonate can be used in a wider range of applications.

DESCRIPTION OF EMBODIMENTS

Figure 1:
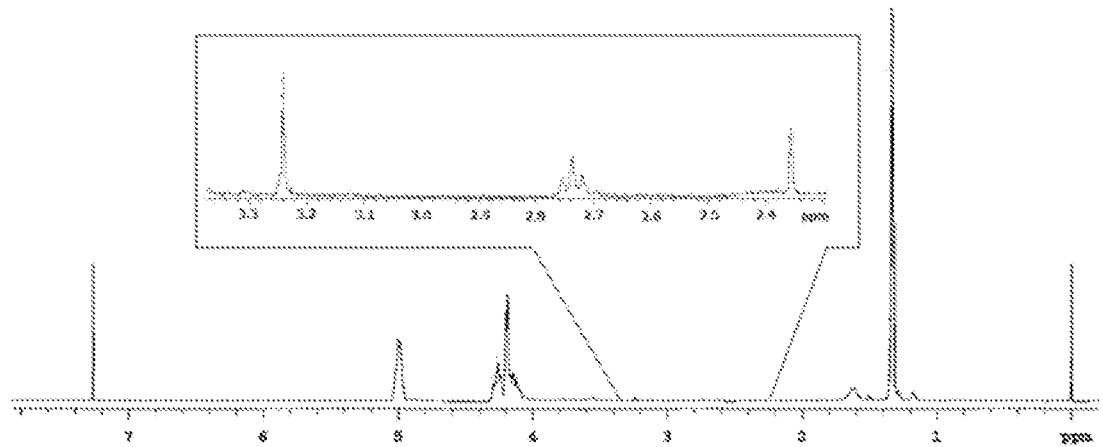
FIG. 1 is a $^1$H-NMR spectrum of the aliphatic polycarbonate obtained in Example 1.

Embodiments encompassed by the present disclosure are described in more detail below. The present disclosure preferably includes an aliphaticpolycarbonate, a composition comprising the aliphatic polycarbonate, and the like; however, it is not limited thereto. The present disclosure includes everything disclosed in the present specification and recognizable to those skilled in the art.

The aliphatic polycarbonate encompassed by the present disclosure comprises a constituent unit represented by formula (1) and a constituent unit represented by formula (2), both of which are described in detail below. Hereinafter, the aliphatic polycarbonate encompassed by the present disclosure may be referred to as "the aliphatic polycarbonate according to the present disclosure." The composition comprising the aliphatic polycarbonate may be referred to as "the aliphatic polycarbonate-containing composition according to the present disclosure."

The aliphatic polycarbonate according to the present disclosure comprises a constituent unit represented by formula (1):

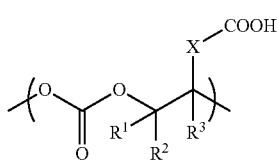

(1)

wherein $R^1$, $R^2$, and $R^3$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^1$ to $R^3$, taken together with the carbon atom or carbon atoms to which these groups are attached, may form a substituted or unsubstituted, saturated or unsaturated 3- to 10-membered aliphatic ring; and x represents a divalent group containing one or more heteroatoms or an alkylene group having 3 or more carbon atoms, and a constituent unit represented by formula (2):

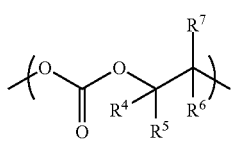

(2)

wherein $R^4$, $R^5$, $R^6$, and $R^7$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^4$ to $R^7$, taken together with the carbon atom or carbon atoms to which these groups are attached, may form a substituted or unsubstituted, saturated or unsaturated 3- to 10-membered aliphatic ring.

As stated above, $R^1$, $R^2$, and $R^3$ are identical or different. More specifically, it is possible that $R^1$, $R^2$, and $R^3$ are all identical; that $R^1$ and $R^2$ are identical, while $R^3$ is different; that $R^2$ and $R^3$ are identical, while $R^1$ is different; or that $R^1$, $R^2$, and $R^3$ are all different.

The alkyl group represented by $R^1$, $R^2$, and $R^3$ is a linear or branched alkyl group having 1, 2, 3, 4, 5, 6, 7, 8, 9, or 10 carbon atoms. The number of carbon atoms is preferably 1 to 9, more preferably 1 to 8, even more preferably 1 to 6, and still even more preferably 1 to 4. Specific examples include a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like.

The alkyl group represented by $R^1$, $R^2$, and $R^3$ may be substituted with one or more substituents. Examples of the substituents in the alkyl group represented by $R^1$, $R^2$, and $R^3$ include an alkoxy group, an acyloxy group, an alkoxycarbonyl group, an aryl group, a halogen atom (e.g., a fluorine atom, a chlorine atom, a bromine atom, and an iodine atom), and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like. Examples of the aryl group include a phenyl group, an o-tolyl group, an m-tolyl group, a p-tolyl group, a naphthyl group, an indenyl group, and the like.

The aryl group represented by $R^1$, $R^2$, and $R^3$ is an aryl group having 6, 7, 8, 9, 10, 11, 12, 13, 14, 15, 16, 17, 18, 19, or 20 carbon atoms, and preferably an aryl group having 6 to 14 carbon atoms. Examples include a phenyl group, an indenyl group, a naphthyl group, a tetrahydronaphthyl group, and the like.

The aryl group represented by $R^1$, $R^2$, and $R^3$ may be substituted with one or more substituents. Examples of the substituents in the aryl group include an alkyl group, an aryl group, an alkoxy group, an acyloxy group, an alkoxycarbonyl group, a halogen atom (e.g., a fluorine atom, a chlorine atom, a bromine atom, and an iodine atom), and the like. Examples of the alkyl group include a methyl group, an ethyl group, an n-propyl group, an isopropyl group, an n-butyl group, a sec-butyl group, a tert-butyl group, and the like. Examples of the aryl group include a phenyl group, an o-tolyl group, an m-tolyl group, a p-tolyl group, a naphthyl group, an indenyl group, and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like.

Examples of the substituted or unsubstituted, saturated or unsaturated 3- to 10-membered aliphatic ring formed by two groups from among $R^1$, $R^2$, and $R^3$ bonded to each other include a 3- to 8-membered aliphatic ring that may be substituted with a substituent. Specific examples of the aliphatic ring include a cyclopentane ring, a cyclopentene ring, a cyclohexane ring, a cyclohexene ring, a cycloheptane ring, and the like. When the aliphatic ring is substituted with a substituent, examples of the substituent include an alkyl group, an aryl group, an alkoxy group, an acyloxy group, a silyl group, a sulfanyl group, a cyano group, a nitro group, a sulfo group, a formyl group, a halogen atom (e.g., a fluorine atom, a chlorine atom, a bromine atom, and an iodine atom), and the like. The aliphatic ring may be substituted with one or more substituents. Examples of the alkyl group include a methyl group, an ethyl group, an n-propyl group, an isopropyl group, an n-butyl group, a sec-butyl group, a tert-butyl group, and the like. Examples of the aryl group include a phenyl group, an o-tolyl group, an m-tolyl group, a p-tolyl group, a naphthyl group, an indenyl group, and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like.

Although there is no particular limitation, it is preferable that $R^1$, $R^2$, and $R^3$ are identical or different, and are each a hydrogen atom or an alkyl group having 1 to 4 carbon atoms. Of these, $R^1$, $R^2$, and $R^3$ are preferably hydrogen atoms.

In formula (1), X represents a divalent group containing one or more heteroatoms or an alkylene group having 3 or more carbon atoms. When X is the divalent group, it may contain one or more (for example, two, three, four, or five) heteroatoms.

The alkylene group having 3 or more carbon atoms represented by X may be linear or branched. The alkylene group is preferably an alkylene group having 3 to 10 (3, 4, 5, 6, 7, 8, 9, or 10) carbon atoms. Specific examples include a trimethylene group, a tetramethylene group, a pentamethylene group, a hexamethylene group, a 2-methylpropylene group, a cyclohexylene group, and the like.

The divalent group containing one or more heteroatoms represented by X is preferably a divalent group containing at least one atom selected from the group consisting of an oxygen atom, a nitrogen atom, and a sulfur atom; and more preferably a divalent group having, at least one linkage selected from the group consisting of an ether linkage, an ester linkage, an amino linkage (e.g., —NH—; the same applies below), an amide linkage, a sulfide linkage, and a thioester linkage. In terms of ease of production, the divalent group more preferably has one or more (e.g., two, three, four, or five) linkages selected from the group consisting of an ether linkage, an ester linkage, and a sulfide linkage. When the divalent group has two or more linkages selected from this group, the two or more linkages may be identical or different; it is preferable that the two or more linkages are different.

More specifically, the divalent group containing one or more heteroatoms represented by X is preferably a group represented by the following formula (a):

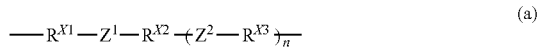 (a)

wherein $R^{X1}$, $R^{X2}$, and $R^{X3}$ are identical or different, and each represents a single bond (a bond), a linear or branched alkylene group having 1 to 6 (1, 2, 3, 4, 5, or 6) carbon atoms (e.g., a trimethylene group, a tetramethylene group, a pentamethylene group, a hexamethylene group, a 2-methylpropylene group, or a cyclohexylene group), or —$C_6H_4$—; $Z^1$ and $Z^2$ are identical or different, and each represents an ether linkage, an ester linkage, an amino linkage, an amide linkage, a sulfide linkage, or a thioester linkage; and n represents 0 or 1. When n=0, it is preferable that $R^{X2}$ is not a single bond. When n=1, it is preferable that $R^{X2}$ and $R^{X3}$ are not single bonds. Further, —$C_6H_4$— is a group represented by the following.

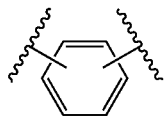

More specifically, —$C_6H_4$— is any one of the following three groups. Of these, the leftmost group is preferable.

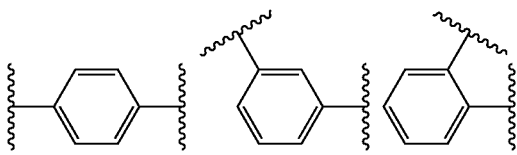

More specific preferred examples of the divalent group containing one or more heteroatoms represented by X include, assuming that the side bonded to —COOH is the right side, —$CH_2OCH_2$—, —$CH_2OCH_2CH_2$—, —$CH_2OCH(CH_3)$—, —$CH_2OCH_2CH_2CH_2$—, —$CH_2OCH_2CH(CH_3)$ $CH_2$—, —$CH_2OCH_2CH_2CH_2$—, —$CH_2$ $(OCH_2CH_2)_2$—, —$CH_2CH_2OCH_2$—, —$CH_2CH_2OCH_2CH_2$—, —$CH_2CH_2$ $(OCH_2CH_2)_2$—, —$CH_2SCH_2$—, —$CH_2SCH_2CH_2$—, —$CH_2SCH(CH_3)$—, —$CH_2SCH_2CH_2CH_2$—, —$CH_2SCH_2CH(CH_3)$ $CH_2$—, —$CH_2SCH_2CH_2SCH_2$—, —$CH_2$ $(SCH_2CH_2)_2$—, —$CH_2CH_2SCH_2$—, —$CH_2CH_2SCH_2CH_2$—, —$CH_2CH_2$ $(SCH_2CH_2)_2$—, —$CH_2OCH_2CH_2SCH_2$—, —$CH_2OCH_2CH_2CH_2SCH_2$—, —$CH_2OCH_2SCH_2$—, —$CH_2OCH_2CH_2SCH_2CH_2$—, —$COOCH_2$—, —$COOCH_2CH_2$—, —$COOC_6H_4$—, —$CH_2COOCH_2$—, —$CH_2COOCH_2CH_2$—, —$CH_2COOC_6H_4$—, —$CH_2OCOCH_2$—, —$CH_2OCOC_6H_4$—, —$CH_2CH_2COOCH_2$—, —$CH_2CH_2COOC_6H_4$—, —$CH_2CH_2OCOCH_2$—, —$CH_2CH_2OCOCH_2C_6H_4$—, —$CH_2OCH_2COOCH_2$—, —$CH_2SH_2COOCH_2$—, —$CH_2OCH_2CH_2OCOCH_2$—, and the like.

As stated above, $R^4$, $R^5$, $R^6$, and $R^7$ are identical or different. More specifically, it is possible that $R^4$, $R^5$, $R^6$, and $R^7$ are all identical; that $R^4$, $R^5$, and $R^6$ are identical, while $R^7$ is different; that $R^4$, $R^6$, and $R^7$ are identical, while $R^5$ is different; or that $R^4$, $R^5$, $R^6$, and $R^7$ are all different.

The alkyl group represented by $R^4$, $R^5$, $R^6$, and $R^7$ is a linear or branched alkyl group having 1, 2, 3, 4, 5, 6, 7, 8, 9, or 10 carbon atoms. The number of carbon atoms is preferably 1 to 9, more preferably 1 to 8, even more preferably 1 to 6, and still even more preferably 1 to 4. Specific examples include a methyl group, an ethyl group, an n-propyl group, an isopropyl group, an n-butyl group, a sec-butyl group, a tert-butyl group, an n-pentyl group, an n-hexyl group, an n-heptyl group, an n-octyl group, an n-nonyl group, an n-decyl group, and the like.

The alkyl group represented by $R^4$, $R^5$, $R^6$, and $R^7$ may be substituted with one or more substituents. Examples of the substituents in the alkyl group include an alkoxy group, an acyloxy group, an alkoxycarbonyl group, an aryl group, a halogen atom (e.g., a fluorine atom, a chlorine atom, a bromine atom, and an iodine atom), and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like. Examples of the aryl group include a phenyl group, an o-tolyl group, an m-tolyl group, a p-tolyl group, a naphthyl group, an indenyl group, and the like.

The aryl group represented by $R^4$, $R^5$, $R^6$, and $R^7$ is an aryl group having 6, 7, 8, 9, 10, 11, 12, 13, 14, 15, 16, 17, 18, 19, or 20 carbon atoms, and preferably an aryl group having 6 to 14 carbon atoms. Examples include a phenyl group, an indenyl group, a naphthyl group, a tetrahydronaphthyl group, and the like.

The aryl group represented by $R^4$, $R^5$, $R^6$, and $R^7$ may be substituted with one or more substituents. Examples of the substituents in the aryl group include an alkyl group, an aryl group, an alkoxy group, an acyloxy group, an alkoxycarbonyl group, a halogen atom (e.g., a fluorine atom, a chlorine atom, a bromine atom, and an iodine atom), and the like. Examples of the alkyl group include a methyl group, an ethyl group, an n-propyl group, an isopropyl group, an n-butyl group, a sec-butyl group, a tert-butyl group, and the like. Examples of the aryl group include a phenyl group, an o-tolyl group, an m-tolyl group, a p-tolyl group, a naphthyl group, an indenyl group, and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like.

Examples of the substituted or unsubstituted, saturated or unsaturated 3- to 10-membered aliphatic ring formed by two groups from among $R^4$, $R^5$, $R^6$, and $R^7$ bonded to each other include a 3- to 8-membered aliphatic ring that may be substituted with a substituent. Specific examples of the aliphatic ring include a cyclopentane ring, a cyclopentene ring, a cyclohexane ring, a cyclohexene ring, a cycloheptane ring, and the like. When the aliphatic ring is substituted with a substituent, examples of the substituent include an alkyl group, an aryl group, an alkoxy group, an acyloxy group, a silyl group, a sulfanyl group, a cyano group, a nitro group, a sulfo group, a formyl group, a halogen atom (e.g., a fluorine atom, a chlorine atom, a bromine atom, and an iodine atom), and the like. The aliphatic ring may be substituted with one or more substituents. Examples of the alkyl group include a methyl group, an ethyl group, an n-propyl group, an isopropyl group, an n-butyl group, a sec-butyl group, a tert-butyl group, and the like. Examples of the aryl group include a phenyl group, an o-tolyl group, an m-tolyl group, a p-tolyl group, a naphthyl group, an indenyl group, and the like. Examples of the alkoxy group include a methoxy group, an ethoxy group, an isopropoxy group, a tert-butoxy group, and the like. Examples of the acyloxy group include an acetoxy group, a propionyloxy group, a butyryloxy group, an isobutyryloxy group, a pivaloyloxy group, a benzoyloxy group, and the like. Examples of the alkoxycarbonyl group include a methoxycarbonyl group, an ethoxycarbonyl group, a tert-butoxycarbonyl group, and the like.

It is preferable that $R^4$, $R^5$, $R^6$, and $R^7$ are identical or different, and are each a hydrogen atom or an alkyl group having 1 to 4 carbon atoms. In particular, it is preferable that $R^4$, $R^5$, and $R^6$ are hydrogen atoms, while $R^7$ is an alkyl group having 1 to 4 carbon atoms. In particular, it is more preferable that $R^7$ is a methyl group or an ethyl group.

The amount (content) of the constituent unit represented by formula (1) is 0.1 mol % or more and 1.5 mol % or less, based on the total amount of the constituent unit represented by formula (1) and the constituent unit represented by formula (2). The lower limit of this range may be, for example, 0.15, 0.2, 0-25, 0.3, 0.35, 0.4, 0.45, 0.5, 0.55, 0.6, 0.65, or 0.7 mol %. The upper limit of this range may be, for example, 1.45, 1.4, 1.35, 1.3, 1.25, 1.2, 1.15, 1.1, 1.05, or 1.0 mol %. In particular, the content is preferably 0.2 mol % or more, and more preferably 0.4 mol % or more. The content is also preferably 1.2 mol % or less, and more preferably 1.0 mol % or less.

The above content is a value determined by subjecting the aliphatic polycarbonate to neutralization titration. More specifically, the content is a value determined as follows.

2.0 g of the aliphatic polycarbonate is dissolved in 40.0 g of a tetrahydrofuran/water solution (tetrahydrofuran/water=10/1 (wt/wt)), and the resulting solution is subjected to neutralization titration with a 0.1 mol/L sodium hydroxide aqueous solution. The content of the constituent unit represented by formula (1) in the resin is calculated from the amount of sodium hydroxide aqueous solution required and the amount of sodium hydroxide aqueous solution required for a blank test (measurement using a solution containing no aliphatic polycarbonate). More specifically, taking the aliphatic polycarbonate consisting of the constituent units of formula (1) and formula (2) as an example, the following equation holds, where F1 and F2 are the molecular weights of the constituent units of formula (1) and formula (2), respectively, a (mol %) is the content of the constituent unit represented by formula (1), V1 (mL) is the amount of sodium hydroxide aqueous solution required for dropwise addition, and V2 (mL) is the amount of sodium hydroxide aqueous solution required for the blank test. Thus, the content of the constituent unit represented by formula (1), i.e., "a," is calculated by substituting the titration results into the equation.

$$\frac{\text{Mass of sample (aliphatic polycarbonate) used}}{F1 \times a + F2 \times (100 - a)} \times a =$$

$$\text{Concentration of sodium hydroxide aqueous solution} \times \frac{(V1 - V2)}{1000}$$

The aliphatic polycarbonate according to the present disclosure may further comprise a constituent unit other than the constituent unit represented by formula (1) and the constituent unit represented by formula (2), as long as the effects are not impaired; or may consist of the constituent unit represented by formula (1) and the constituent unit represented by formula (2).

Examples of the constituent unit other than the constituent units represented by formula (1) and formula (2) include constituent units that, by repeating such a constituent unit, form polyether, polyester, polycarbonate, polyurethane, or polyamide; and the like. The content of the constituent unit other than the constituent units represented by formula (1) and formula (2) is preferably 100 mol % or less, more preferably 50 mol % or less, and even more preferably 25, 24, 23, 22, 21, 20, 19, 18, 17, 16, 15, 14, 13, 12, 11, 10, 9, 8, 7, 6, 5, 4, 3, 2, or 1 mol % or less, based on the total amount of the constituent unit represented by formula (1) and the constituent unit represented by formula (2).

Moreover, the aliphatic polycarbonate according to the present disclosure may comprise one or a plurality of types of constituent units represented by formula (1), and may comprise one or a plurality of types of constituent units represented by formula (2). The plurality of types here may be, for example, two, three, four, or five types. As the constituent unit represented by formula (1), only one type of constituent unit represented by formula (1) may be contained in the aliphatic polycarbonate. As the constituent unit represented by formula (2), only one type of constituent unit represented by formula (2) may be contained in the aliphatic polycarbonate. Further, the aliphatic polycarbonate may comprise only one type of constituent unit represented by formula (1), and only one type of constituent unit represented by formula (2).

Examples of the method for producing the aliphatic polycarbonate according to the present disclosure include (a) a method comprising subjecting specific epoxides and carbon dioxide to a polymerization reaction, preferably in the presence of a metal catalyst, to obtain an aliphatic polycarbonate; and (R) a method comprising subjecting specific epoxides and carbon dioxide to a polymerization reaction, preferably in the presence of a metal catalyst, to obtain an aliphatic polycarbonate (main chain), and then further providing and/or modifying a side chain by a modification reaction (e.g., an addition reaction, a substitution reaction, or a deprotection reaction) (for example, a carboxy group is provided via X). A reactive group may be introduced before the modification reaction. In terms of ease of production, the method (β) is more preferable. The modification reaction may be only one reaction, or a combination of two or more reactions.

The method (β) is described in more detail below.

Among the specific epoxides, examples of epoxides that can be used for forming the constituent unit represented by formula (1) include 1,3-butadiene monoepoxide, 1,2-epoxy-5-hexene, 1,2-epoxy-9-decene, vinyl glycidyl ether, allyl glycidyl ether, glycidyl acrylate, glycidyl methacrylate, propargyl glycidyl ether, furfuryl glycidyl ether, epichlorohydrin, epibromohydrin, 2-(chloroethyl) oxirane, (2-bromoethyl) oxirane, (3-chloropropyl)oxirane, (3-bromopropyl) oxirane, p-fluorostyrene oxide, p-fluorobenzyloxirane, glycidyl p-toluenesulfonate, glycidyl methanesulfonate, benzyl glycidyl ether, o-nitrobenzyl glycidyl ether, trimethylsilyl glycidyl ether, tert-butyldimethylsilyl glycidyl ether, tert-butyl glycidyl ether, 1-ethoxyethyl glycidyl ether, benzyl 3-oxiranylbutyrate, tert-butyl 3-oxiranylbutyrate, glycidyl dibenzylamine, and the like. These may be used singly, or in a combination of two or more. By using these epoxides, for example, a reactive group can be introduced into a side chain of the aliphatic polycarbonate, and a modification reaction can be started from the reactive group.

Examples of epoxides that can be used for forming the constituent unit represented by formula (2) include ethylene oxide, propylene oxide, 1-butene oxide, 2-butene oxide, isobutylene oxide, 1-pentene oxide, 2-pentene oxide, 1-hexene oxide, 1-octene oxide, 1-dodecene oxide, cyclopentene oxide, cyclohexene oxide, styrene oxide, vinyl cyclohexane oxide, 3-phenylpropylene oxide, epichlorohydrin, 3,3,3-trifluoropropylene oxide, 3-naphthylpropylene oxide, 3-phenoxypropylene oxide, 3-naphthoxypropylene oxide, butadiene monoxide, 3-vinyloxypropylene oxide, 3-trimethylsilyloxypropylene oxide, and the like. These may be used singly, or in a combination of two or more. Of these, ethylene oxide, propylene oxide, and cyclohexene oxide are preferable because of their high reactivity.

A metal catalyst may be used in a polymerization reaction of these epoxides and carbon dioxide. Examples of the metal catalyst include zinc-based catalysts, aluminum-based catalysts, chromium-based catalysts, cobalt-based catalysts, and the like. Of these, zinc-based catalysts and cobalt-based catalysts are preferable because of their high polymerization activity in a polymerization reaction of the epoxides and carbon dioxide.

Preferred examples of zinc-based catalysts include organozinc catalysts. Examples of organozinc catalysts include organozinc catalysts, such as zinc acetate, diethylzinc, and dibutylzinc; organozinc catalysts obtainable by reacting a zinc compound with a compound such as a primary amine, a dihydric phenol, an aromatic dicarboxylic acid, an aromatic hydroxy acid, an aliphatic dicarboxylic acid, or an aliphatic monocarboxylic acid; and the like. Among these organozinc catalysts, organozinc catalysts obtainable by reacting a zinc compound, an aliphatic dicarboxylic acid, and an aliphatic monocarboxylic acid are preferred; and organozinc catalysts obtainable by reacting zinc oxide, glutaric acid, and acetic acid are more preferred, because of their even higher polymerization activity.

Examples of cobalt-based catalysts include a cobalt complex represented by the following formula (3):

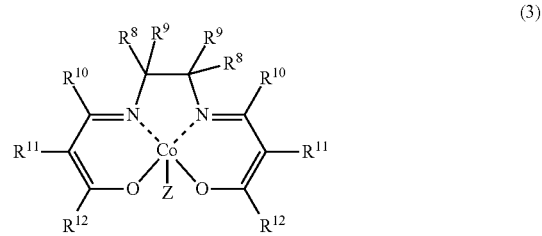

(3)

wherein $R^8$ and $R^9$ are each independently a hydrogen atom, a substituted or unsubstituted alkyl group, a substituted or unsubstituted aromatic group, or a substituted or unsubstituted aromatic heterocyclic ring group, or two $R^8$s or two $R^9$s taken together may form a substituted or unsubstituted, saturated or unsaturated aliphatic ring; $R^{10}$, $R^{11}$, and $R^{12}$ are each independently a hydrogen atom, a substituted or unsubstituted alkyl group, a substituted or unsubstituted alkenyl group, a substituted or unsubstituted aromatic group, a substituted or unsubstituted aromatic heterocyclic ring group, a substituted or unsubstituted alkoxy group, a substituted or unsubstituted acyl group, a substituted or unsubstituted alkoxycarbonyl group, a substituted or unsubstituted aromatic oxycarbonyl group, or a substituted or unsubstituted aralkyloxycarbonyl group, or $R^{11}$ and $R^{12}$ attached to adjacent carbon atoms taken together may form a substituted or unsubstituted aliphatic ring or a substituted or unsubstituted aromatic ring; and Z is an anionic ligand selected from the group consisting of $F^-$, $Cl^-$, $Br^-$, $I^-$, $N_3^-$, $CF_3SO_3^-$, $p\text{-}CH_3C_6H_4SO_3^-$, $BF_4^-$, $NO_2^-$, $NO_3^-$, $OH^-$, $PF_6^-$, $BPh_4^-$, $SbF_6^-$, $ClO_4^-$, an aliphatic carboxylate, an aromatic carboxylate, an alkoxide, and an aromatic oxide.

Among the cobalt complexes represented by formula (3), specific preferred examples include cobalt complexes represented by the following formulas (4-1) to (4-5).

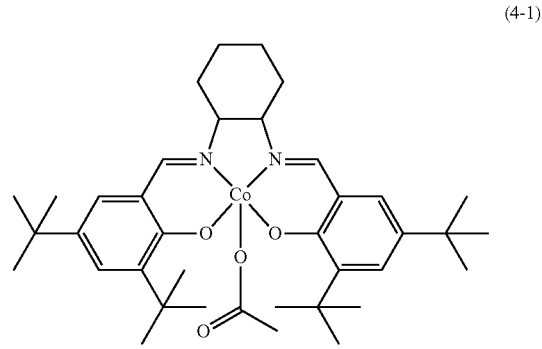

(4-1)

(4-2)
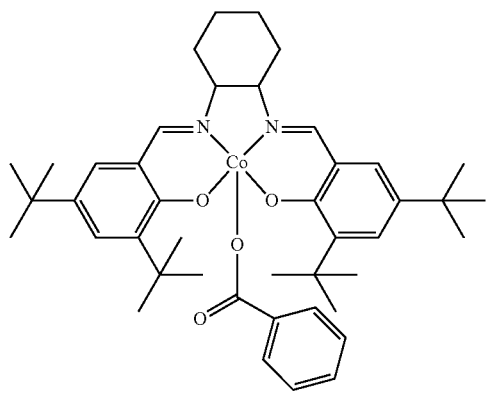

(4-3)
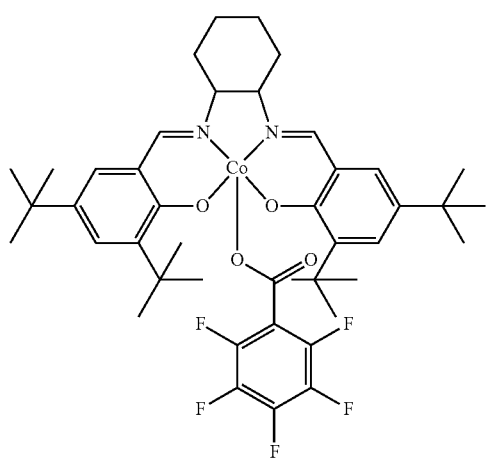

(4-4)
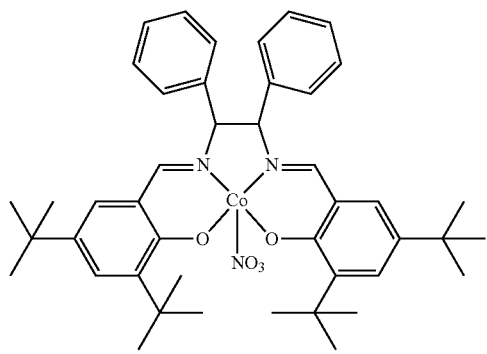

(4-5)
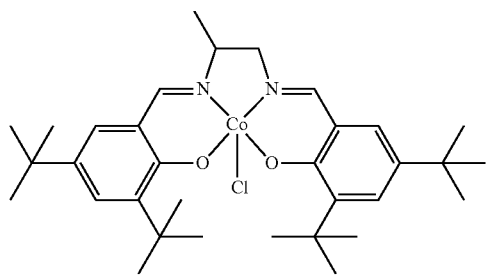

The amount of the metal catalyst used in the polymerization reaction is preferably 0.001 parts by mass or more, and more preferably 0.01 parts by mass or more, based on 100 parts by mass of the epoxides, from the viewpoint of accelerating the progress of the polymerization reaction. Further, the amount is preferably 30 parts by mass or less, and more preferably 20 parts by mass or less, from the viewpoint of obtaining effects that are commensurate with the amount used.

The above polymerization reaction may be carried out optionally in the presence of a co-catalyst, in addition to the metal catalyst. Examples of the co-catalyst include bis (triphenylphosphoranylidene) ammonium chloride (PPNCl), piperidine, bis(triphenylphosphoranylidene) ammonium fluoride (PPNF), bis(triphenylphosphoranylidene) ammonium pentafluorobenzoate (PPNOBzF$_5$), tetra-n-butylammonium chloride (nBu$_4$NCl), tetra-n-butylammonium bromide (nBu$_4$NBr), tetra-n-butylammonium iodide (nBu$_4$NI), tetra-n-butylammonium acetate (nBu$_4$NOAc), tetra-n-butylammonium nitrate (nBu$_4$NO$_3$), triethyl phosphine (Et$_3$P), tri-n-butyl phosphine (nBu$_3$P), triphenyl phosphine (Ph$_3$P), pyridine, 4-methylpyridine, 4-formylpyridine, 4-(N,N-dimethylamino)pyridine, N-methylimidazole, N-ethylimidazole, N-propylimidazole, and the like. Among these, PPNCl, PPNF, PPNOBzF$_5$, and nBu$_4$NCl are preferred; and PPNCl and PPNF are more preferred, from the viewpoint of having high reaction activity.

The amount of the co-catalyst used is preferably 0.1 to moles, more preferably 0.3 to 5 moles, and even more preferably 0.5 to 1.5 moles, per mole of the metal catalyst.

In the above polymerization reaction, a reaction solvent may be optionally used. Examples of the reaction solvent include aliphatic hydrocarbon-based solvents, such as pentane, hexane, octane, decane, and cyclohexane; aromatic hydrocarbon-based solvents, such as benzene, toluene, and xylene; halogenated hydrocarbon-based solvents, such as methylene chloride, chloroform, carbon tetrachloride, 1,1-dichloroethane, 1,2-dichloroethane, ethyl chloride, trichloroethane, 1-chloropropane, 2-chloropropane, 1-chlorobutane, 2-chlorobutane, 1-chloro-2-methylpropane, chlorobenzene, and bromobenzene; ether-based solvents, such as dimethoxyethane, tetrahydrofuran, 2-methyltetrahydrofuran, 1,4-dioxane, 1,3-dioxolane, and anisole; ester-based solvents, such as ethyl acetate, n-propyl acetate, and isopropyl acetate; amide-based solvents, such as N,N-dimethylformamide and N,N-dimethylacetamide; carbonate-based solvents, such as dimethyl carbonate, ethyl methyl carbonate, diethyl carbonate, and propylene carbonate; and the like.

The amount of the reaction solvent used is preferably 100 to 10000 parts by mass, more preferably 200 to 5000 parts by mass, and even more preferably 300 to 1000 parts by mass, based on 100 parts by mass of the epoxides, to allow the reaction to smoothly proceed.

Examples of the method for carrying out a polymerization reaction of specific epoxides and carbon dioxide in the presence of a metal catalyst include a method comprising charging an autoclave with specific epoxides, a metal catalyst, and optionally a co-catalyst, a reaction solvent, and the like; mixing the contents; and pressurizing the autoclave with carbon dioxide to allow a reaction to proceed.

The amount of carbon dioxide used in the above polymerization reaction is preferably 1 to 10 moles, more preferably 1 to 5 moles, and even more preferably 1 to 3 moles, per mole of the epoxides. Carbon dioxide may be added at one time, sequentially, or continuously.

The pressure of carbon dioxide used in the polymerization reaction is preferably 0.1 MPa or more, more preferably 0.2 MPa or more, and even more preferably 0.5 MPa or more, to allow the reaction to smoothly proceed. Further, the pressure is preferably 20 MPa or less, more preferably 10 MPa or less, and even more preferably 5 MPa or less, from the viewpoint of obtaining effects that are commensurate with the pressure used.

The polymerization reaction temperature in the polymerization reaction is preferably 0° C. or higher, more preferably 10° C. or higher, and even more preferably 20° C. or higher, from the viewpoint of shortening the reaction time. Further, the polymerization reaction temperature is preferably 100° C. or lower, more preferably 90° C. or lower, and even more preferably 80° C. or lower, from the viewpoint of controlling side reactions, thereby increasing the yield.

The polymerization reaction time cannot be unconditionally determined because the polymerization reaction time differs depending upon the polymerization reaction conditions. The polymerization reaction time is generally preferably about 1 to 40 hours.

The aliphatic polycarbonate according to the present disclosure can be produced by introducing a carboxy group into the thus-obtained aliphatic polycarbonate (hereinafter also referred to as "the aliphatic polycarbonate precursor"; the constituent unit corresponding to formula (1), of the precursor may be referred to as "the precursor of the constituent unit represented by formula (1)"). Examples of the method for introducing a carboxy group include a method comprising oxidizing a side chain moiety of the aliphatic polycarbonate precursor to be converted into a carboxy group; a method introducing a carboxy group by a substitution reaction; a method using a deprotection reaction; a method comprising introducing a carboxy group by an addition reaction; any combinations of these methods; and the like. Among these, a method using a deprotection reaction or a method comprising introducing a carboxy group by an addition reaction is preferably used in terms of ease of reaction.

Examples of the method using a deprotection reaction include a method comprising subjecting a benzyl ester group to a hydrogenation reaction to introduce a carboxy group; a method comprising subjecting a benzyl ether group or benzylamino group to a hydrogenation reaction or subjecting a silyl ether group or acetal group to a hydrolysis reaction, to thereby introduce a hydroxy group or amino group, and reacting the hydroxy group or amino group with a cyclic acid anhydride or the like to introduce a carboxy group; and the like.

The hydrogenation reaction for deprotection of a benzyl ester group, a benzyl ether group, or a benzylamino group is generally performed in an appropriate solvent in the presence of a catalyst under a hydrogen atmosphere.

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,4-dioxane, anisole, dimethyl carbonate, propylene carbonate, and the like.

Examples of the catalyst include nickel-based catalysts, cobalt-based catalysts, ruthenium-based catalysts, rhodium-based catalysts, palladium-based catalysts, platinum-based catalysts, mixtures thereof, and alloy-based catalysts.

The amount of the catalyst used is generally at least 0.05 moles or more, and preferably 0.1 to 0.3 moles, per mole of the precursor of the constituent unit represented by formula (1).

The pressure of hydrogen used is generally 0.05 MPa or more and 15 MPa or less, and preferably 0.1 MPa or more and 6 MPa or less.

The reaction generally suitably proceeds at about 0 to 100° C. (preferably 20 to 80° C.), and the reaction is usually completed in about 2 to 24 hours.

The hydrolysis reaction for deprotection of a silyl ether group or acetal group is generally performed in an appropriate solvent in the presence of an acid catalyst.

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,4-dioxane, anisole, dimethyl carbonate, propylene carbonate, and the like.

Examples of the acid catalyst include inorganic acids, such as hydrochloric acid, sulfuric acid, and phosphoric acid; organic acids, such as formic acid, acetic acid, and trifluoromethanesulfonic acid; and solid acids, such as a strongly acidic or weakly acidic ion-exchange resin, mesoporous silica, zeolite, and acidic alumina.

The amount of the catalyst used is generally at least 0.05 moles or more, and preferably 0.1 to 0.3 moles, per mole of the precursor of the constituent unit represented by formula (1).

The reaction generally suitably proceeds at about 0 to 100° C. (preferably 20 to 80° C.), and the reaction is usually completed in about 2 to 24 hours.

By performing the reaction, the side chain of the precursor of the constituent unit represented by formula (1) can be converted to a structure with a hydroxy group or an amino group. The hydroxy group or amino group can be further converted to a constituent unit represented by formula (1) by reacting it with a cyclic acid anhydride or the like in an appropriate solvent.

Examples of the cyclic acid anhydride include succinic anhydride, maleic anhydride, glutaric anhydride, 1,2-cyclohexanedicarboxylic anhydride, phthalic anhydride, and the like.

Examples of the solvent include benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,4-dioxane, anisole, dimethyl carbonate, propylene carbonate, and the like.

The reaction generally suitably proceeds at about 0 to 100° C. (preferably 20 to 80° C.), and the reaction is usually completed in, about 2 to 24 hours.

Examples of the method for introducing a carboxy group by an addition reaction include a method comprising adding an unsaturated carboxylic acid by a metathesis reaction, a Diels-Alder reaction, or the like; a method comprising adding a carboxylic acid with an amino group or a hydroxy group by a Michael addition reaction; a method comprising adding a carboxylic acid with a mercapto group by a thiol-ene reaction; and the like.

Examples of the unsaturated carboxylic acid used in the metathesis reaction include acrylic acid, methacrylic acid, 3-butenoic acid, p-vinylbenzoic acid, and the like.

The amount of the unsaturated carboxylic acid used is generally at least 1 mole or more, and preferably 1 to 10 moles, per mole of the precursor of the constituent unit represented by formula (1).

The reaction is generally performed in an appropriate solvent in the presence of a catalyst.

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,4-dioxane, anisole, dimethyl carbonate, propylene carbonate, and the like.

Examples of the catalyst include tricyclohexylphosphine [1,3-bis(2,4,6-trimethylethylphenyl) imidazol-2-ylidene] [3-phenyl-1H-inden-1-ylidene] ruthenium dichloride, tricyclohexylphosphine [3-phenyl-1H-inden-1-ylidene] [1,3-bis(2,4,6-trimethylethylphenyl)-4,5-dihydro-imidazol-2-ylidene]ruthenium dichloride, tricyclohexylphosphine [1,3-bis(2,4,6-trimethylethylphenyl)-4,5-dihydroimidazol-2-ylidene] [(phenylthio)methylene] ruthenium dichloride, bis(tricyclohexylphosphine)-3-phenyl-1H-inden-1-ylideneruthenium dichloride, 1,3-bis(2,4,6-trimethylethylphenyl)-4,5-dihydroimidazol-2-ylidene [2-(isopropoxy)-5-(N,N-dimethylaminosulfonyl)phenyl] methylene ruthenium dichloride, (2,6-diisopropylphenylimido) (neophylidene)molybdenum bis(tert-butoxide), (2,6-diisopropylphenylimido) (neophylidene)molybdenum bis(hexafluoro-tert-butoxide), (2-trifluoromethyl-2-phenyl-1,1,1-trifluoroethoxy) 2,6-dimethylphenylimidotungsten (2,5-dimethylpyrrolido) (neophylidene) (1,10-phenanthroline), (2-trifluoromethyl-2-phenyl-1,1,1-trifluoroethoxy) phenylimidotungsten (2,5-dimethylpyrrolido) (neophylidene) (1,10-phenanthroline), and the like.

The amount of the catalyst used is generally at least 0.01 moles or more, and preferably 0.05 to 0.3 moles, per mole of the precursor of the constituent unit represented by formula (1).

The reaction generally suitably proceeds at about 0 to 100° C. (preferably 20 to 80° C.), and the reaction is usually completed in about 2 to 24 hours.

Examples of the unsaturated carboxylic acid used in the Diels-Alder reaction include 2-furancarboxylic acid, 1,3-cyclopentadiene-1-carboxylic acid, 2,4-cyclopentadiene-1-carboxylic acid, 1,3-butadiene-1-carboxylic acid, and the like.

The amount of the unsaturated carboxylic acid used is generally at least 1 mole or more, and preferably 1 to 5 moles, per mole of the precursor of the constituent unit represented by formula (1).

The reaction is generally performed in an appropriate solvent in the presence or absence of a Lewis acid.

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,2-dimethoxyethane, 1,4-dioxane, anisole, dimethyl carbonate, propylene carbonate, and the like.

Examples of the Lewis acid include aluminum chloride, aluminum bromide, aluminum isopropoxide, trimethylaluminum, titanium tetrachloride, titanium isopropoxide, boron trifluoride diethyl etherate, and the like.

When a Lewis acid is used, the amount of the Lewis acid used is generally at least 0.05 moles or more, and preferably 0.1 to 1 mole, per mole of the precursor of the constituent unit represented by formula (1).

The reaction generally suitably proceeds at about 0 to 120° C. (preferably 25 to 80° C.), and the reaction is usually completed in about 3 to 48 hours.

Examples of the carboxylic acid with an amino group or a hydroxy group used in the Michael reaction include glycine, leucine, glycolic acid, lactic acid, and the like. The reaction is generally performed in an appropriate solvent in the presence of a basic compound.

The amount of the carboxylic acid with an amino group or an hydroxy group used is generally at least 1 mole or more, and preferably 1 to 5 moles, per mole of the precursor of the constituent unit represented by formula (1).

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,2-dimethoxyethane, 1,4-dioxane, anisole, dimethyl carbonate, propylene carbonate, and the like.

Examples of the basic compound include organic bases and inorganic bases. Examples of organic bases include triethylamine, diisopropylethylamine, pyridine, 4-dimethylaminopyridine, 1,8-diazabicyclo [5,4,0]-7-undecene, sodium methoxide, sodium tert-butoxide, and the like. Examples of inorganic bases include sodium hydride, potassium hydride, calcium hydride, sodium hydroxide, potassium hydroxide, sodium carbonate, potassium carbonate, cesium carbonate, sodium hydrogencarbonate, potassium hydrogencarbonate, and the like.

The amount of the basic compound used is generally at least 0.01 moles or more, and preferably 0.1 to 1 mole, per mole of the carboxylic acid with an amino group or an hydroxy group.

The reaction generally suitably proceeds at about −78 to 100° C. (preferably 25 to 60° C.), and the reaction is usually completed in about 3 to 48 hours.

Examples of the carboxylic acid with a mercapto group used in the thiol-ene reaction include thioglycolic acid, 3-mercaptopropionic acid, 4-mercaptobutyric acid, thiolactic acid, 3-mercaptobutyric acid, p-mercaptobenzoic acid, mercaptosuccinic acid, 3-mercaptolactic acid, and the like.

The reaction is generally performed in an appropriate solvent in the presence of a radical initiator.

The amount of the carboxylic acid with a mercapto group used is generally at least 1 mole or more, and preferably 1 to 20 moles, per mole of the precursor of the constituent unit represented by formula (1).

Examples of the solvent include methanol, ethanol, benzene, toluene, xylene, dichloromethane, 1,2-dichloroethane, acetonitrile, N,N-dimethylformamide, dimethyl sulfoxide, ethyl acetate, isopropyl acetate, tetrahydrofuran, 1,2-dimethoxyethane, 1,4-dioxane, anisole, dimethyl carbonate, propylene carbonate, and the like.

Examples of the radical initiator include 2,2'-azobis(isobutyronitrile), 2,2'-azobis(2,4-dimethylvaleronitrile), 2,2'-azobis(2-methylbutyronitrile), 4,4'-azobis(4-cyanovaleric acid), dimethyl 2,2'-azobis(2-methylpropionate), 2,2'-azobis(2-methylpropionamidine) dihydrochloride, benzoyl peroxide, di-tert-butyl peroxide, dicumyl peroxide, tert-butyl hydroperoxide, cumene hydroperoxide, potassium peroxodisulfate, and the like.

The amount of the radical initiator used is generally at least 0.1 moles or more, and preferably 0.5 to 1 mole, per mole of the precursor of the constituent unit represented by formula (1).

Although it depends on the type of radical initiator used, the reaction generally suitably proceeds at about 0 to 120° C. (preferably 20 to 80° C.), and the reaction is usually completed in about 2 to 12 hours.

In each reaction, the reaction product may be suitably purified by using a known purification method (e.g., column chromatography or a reprecipitation method), as necessary.

The mass average molecular weight of the aliphatic polycarbonate according to the present disclosure varies depending on the use, and cannot be generalized; however, it is generally preferably 60000 or more and 1000000 or less.

From the viewpoint of handling, the mass average molecular weight is preferably 60000 or more, more preferably 100000 or more, and even more preferably 200000 or more. From the viewpoint of adequate solubility in a solvent, the mass average molecular weight is preferably 1000000 or less, more preferably 800000 or less, and even more preferably 500000 or less.

The present disclosure also preferably encompasses, as an embodiment thereof, a composition comprising the aliphatic polycarbonate according to the present disclosure (the aliphatic polycarbonate-containing composition according to the present disclosure).

Examples of components other than the aliphatic polycarbonate in the aliphatic polycarbonate-containing composition according to the present disclosure include crosslinking agents, solvents, additives, pigments, monomer components, inorganic materials, and the like. These components other than the aliphatic polycarbonate may be used singly, or in a combination of two or more.

Preferred examples of the composition include a composition comprising the aliphatic polycarbonate according to the present disclosure and a crosslinking agent. This composition can be prepared, for example, by suitably mixing the aliphatic polycarbonate according to the present disclosure and a crosslinking agent. This composition may be referred to as "the polycarbonate crosslinking agent composition" below. Further, this composition can be preferably used as, for example, an adhesive composition.

Examples of the crosslinking agent include epoxy-based crosslinking agents, such as ethylene glycol diglycidyl ether, 1,6-hexanediol diglycidyl ether, trimethylolpropane diglycidyl ether, diglycidylaniline, diglycidylamine, epoxidized soybean oil, glycidyl methacrylate copolymers; isocyanate-based crosslinking agents, such as tolylene diisocyanate, diphenylmethane diisocyanate, xylylene diisocyanate, isophorone diisocyanate, hexamethylene diisocyanate, and cyclohexylene diisocyanate; aziridine-based crosslinking agents, such as diphenylmethane-4,4'-bis(1-aziridinecarboxamide), trimethylolpropane-tri-β-aziridinyl propionate, tetramethylolmethane-tri-β-aziridinyl propionate, and toluene-2,4-bis(1-aziridinecarboxamide); metal chelate crosslinking agents, such as diisopropoxyaluminum monooleyl acetoacetate, monoisopropoxyaluminum bisoleyl acetoacetate, and monoisopropoxyaluminum monooleate monoethyl acetoacetate; and the like.

The amount of the crosslinking agent in the composition is preferably, for example, 0.1 to 20 parts by mass, based on 100 parts by mass of the aliphatic polycarbonate. The lower limit of this range may be, for example, about 0.2, 0.5, 1, 2, 3, 4, or 5 parts by mass. The upper limit of this range may be, for example, about 19, 18, 17, 16, 15, 14, 13, 12, 11, or 10 parts by mass. For example, the amount of the crosslinking agent in the composition is more preferably 0.5 to 15 parts by mass, and even more preferably 1 to 10 parts by mass.

In the composition, a portion of the crosslinking agent may react with the aliphatic polycarbonate to form a crosslink. In this case, it can be said that the composition also comprises a crosslinked aliphatic polycarbonate.

Preferred examples of the composition also include a composition comprising the aliphatic polycarbonate according to the present disclosure or the polycarbonate crosslinking agent composition, and a solvent and/or an additive. This composition can be prepared, for example, by suitably mixing the aliphatic polycarbonate according to the present disclosure or the polycarbonate crosslinking agent composition, and a solvent and/or an additive. Further, this composition can be preferably used as, for example, an adhesive composition, because it preferably exhibits excellent adhesive effects.

Examples of the solvent include toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethyl pentanediol monoisobutyrate, ethyl carbitol, butyl carbitol, ethyl carbitol acetate, butyl carbitol acetate, terpineol, terpineol acetate, dihydro terpineol, dihydro terpineol acetate, texanol, isophorone, butyl lactate, dioctyl phthalate, dioctyl adipate, benzyl alcohol, phenylpropylene glycol, cresol, N,N-dimethylformamide, propylene carbonate, and the like.

Examples of the additive include crosslinking agents, tackifiers, light stabilizers, silane coupling agents, antistatic agents, antioxidants, ultraviolet absorbers, hydrolysis inhibitors, fillers, plasticizers, and the like. Examples of crosslinking agents include ethylene glycol glycidyl ether, hexamethylene diisocyanate, diphenylmethane diisocyanate, and the like.

When the composition is used as an adhesive composition, the composition preferably comprises, for example, a crosslinking agent in an amount of about 2 to 20 parts by mass, based on 100 parts by mass of the aliphatic polycarbonate according to the present disclosure. The lower limit of the content of the crosslinking agent may be about 3, 4, or 5 parts by mass, and the upper limit of the content of the crosslinking agent may be about 19, 18, 17, 16, 15, 14, 13, 12, 11, or 10 parts by mass.

Preferred examples of the composition also include a composition comprising the aliphatic polycarbonate according to the present disclosure or the polycarbonate crosslinking agent composition, and a solvent and/or a pigment. This composition can be prepared, for example, by suitably mixing the aliphatic polycarbonate according to the present disclosure or the polycarbonate crosslinking agent composition, and a solvent and/or a pigment (and other additional components, if necessary). Further, this composition can be preferably used as, for example, an ink composition, because it preferably exhibits excellent settling stability.

Examples of the solvent include toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethyl pentanediol monoisobutyrate, ethyl carbitol, butyl carbitol, ethyl carbitol acetate, butyl carbitol acetate, terpineol, terpineol acetate, dihydro terpineol, dihydro terpineol acetate, texanol, isophorone, butyl lactate, dioctyl phthalate, dioctyl adipate, benzyl alcohol, phenoxyethanol, phenylpropylene glycol, cresol, N,N-dimethylformamide, propylene carbonate, and the like.

Examples of the pigment include inorganic pigments, such as titanium oxide, zinc oxide, cadmium red, ferric ferrocyanide, ultramarine, and carbon black; organic pigments, such as phthalocyanine blue, nickel azo yellow, malachite green lake, dioxazine violet, and aniline black; and the like.

Examples of the other components include surfactants, defoaming agents, dispersants, leveling agents, thixotropic agents, plasticizers, ultraviolet absorbers, and the like. Examples of dispersants include polyvinyl butyral, polyvinylpyrrolidone, ammonium polyacrylate, and the like.

When the composition is used as an ink composition, the composition preferably comprises the pigment in an amount of, for example, about 40 to 70 parts by mass, based on 30 parts by mass of the aliphatic polycarbonate according to the present disclosure. The lower limit of the content of the pigment may be about 41, 42, 43, 44, 45, 46, 47, 48, 49, or 50 parts by mass, and the upper limit of the content of the pigment may be about 69, 68, 67, 66, or 65 parts by mass. In particular, when a dispersant is used in combination, it is preferable to use the dispersant in an amount of about 2 to 10 parts by mass or about 3 to 9 parts by mass, based on 30 parts by mass of the aliphatic polycarbonate, according to the present disclosure.

Preferred examples of the composition also include a composition comprising the aliphatic polycarbonate according to the present disclosure or the polycarbonate crosslinking agent composition, and a solvent and/or an additive; and a monomer component. This composition can be prepared, for example, by suitably mixing the aliphatic polycarbonate according to the present disclosure or the polycarbonate crosslinking agent composition, and a solvent and/or an additive; and a monomer component. Further, this composition can be preferably used as, for example, a coating composition, because it preferably exhibits adhesion to a substrate.

Examples of the solvent include toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethyl pentanediol monoisobutyrate, ethyl carbitol, butyl carbitol, ethyl carbitol acetate, butyl carbitol acetate, terpineol, terpineol acetate, dihydro terpineol, dihydro terpineol acetate, texanol, isophorone, butyl lactate, dioctyl phthalate, dioctyl adipate, benzyl alcohol, phenoxyethanol, phenylpropylene glycol, cresol, N,N-dimethylformamide, propylene carbonate, and the like.

Examples of the additive include fillers such as clay, talc, calcium carbonate, and mica, white pigments such as titanium white, dyes, thickeners such as polyvinyl alcohol, methylcellulose, carboxymethyl cellulose, starch, and dextrin, dispersants, emulsifiers, wetting agents, defoaming agents, film-forming aids, thermal acid generators, photo acid generators, radical generators, curing agents, curing accelerators, and the like. Examples of curing agents include methyltetrahydrophthalic anhydride, metaphenylenediamine, and the like.

Examples of the monomer component include polyfunctional epoxy-based monomers, such as bisphenol A diglycidyl ether, glycerol polyglycidyl ether, polyglycerol polyglycidyl ether, trimethylolpropane polyglycidyl ether, pentaerythritol polyglycidyl ether, sorbitol polyglycidyl ether, resorcinol diglycidyl ether, isosorbide diglycidyl ether, isomannide diglycidyl ether, isoidide diglycidyl ether, hydrogenated bisphenol A diglycidyl ether, and cresol novolac polyglycidyl ether; polyfunctional (meth)acrylate-based monomers, such as diethylene glycol di(meth)acrylate, propylene glycol di(meth)acrylate, trimethylolpropane tri(meth)acrylate, trimethylolpropane ethylene oxide tri(meth)acrylate, dipentaerythritol tetra(meth)acrylate, dipentaerythritol penta(meth)acrylate, and dipentaerythritol hexa(meth)acrylate; and the like. When the composition is used as a coating composition, the composition preferably comprises the monomer in an amount of, for example, about 10 to 70 parts by mass, based on 10 parts by mass of the aliphatic polycarbonate according to the present disclosure. The lower limit of the content of the monomer may be about 11, 12, 13, 14, 15, 16, 17, 18, 19, 20, 21, 22, 23, 24, or 25 parts by mass, and the upper limit of the content of the monomer may be about 69, 68, 67, 66, 65, 64, 63, 62, 61, 60, 59, 58, 57, 56, 55, 54, 53, 52, 51, or 50 parts by mass. In particular, when a curing agent is used in combination, it is preferable that the composition comprises the curing agent in an amount of about 10 to 70 parts by mass, based on 10 parts by mass of the aliphatic polycarbonate according to the present disclosure. The lower limit of the content of the curing agent may be about 11, 12, 13, 14, 15, 16, 17, 18, 19, 20, 21, 22, 23, 24, or 25 parts by mass; and the upper limit of the content of the curing agent may be about 69, 68, 67, 66, 65, 64, 63, 62, 61, 60, 59, 58, 57, 56, 55, 54, 53, 52, 51, or 50 parts by mass. It is more preferable that the monomer and the curing agent are used in approximately equal amounts.

Moreover, the aliphatic polycarbonate according to the present disclosure or the polycarbonate crosslinking agent composition can be used as a binder for sintering (i.e., a binder having a thermal decomposition property). A composition comprising a solvent and/or an additive in addition to the aliphatic polycarbonate according to the present disclosure or the polycarbonate crosslinking agent composition can also be used as a binder for sintering. Examples of the solvent include toluene, ethyl acetate, butyl acetate, isopropyl alcohol, methyl isobutyl ketone, methyl ethyl ketone, N-methyl-2-pyrrolidone, ethylene glycol ethyl ether, ethylene glycol monobutyl ether, ethylene glycol monoethyl ether acetate, diethylene glycol monoethyl ether, diethylene glycol monomethyl ether, diethylene glycol monoisobutyl ether, trimethyl pentanediol monoisobutyrate, ethyl carbitol, butyl carbitol, ethyl carbitol acetate, butyl carbitol acetate, terpineol, terpineol acetate, dihydro terpineol, dihydro terpineol acetate, texanol, isophorone, butyl lactate, dioctyl phthalate, dioctyl adipate, benzyl alcohol, phenylpropylene glycol, cresol, N,N-dimethylformamide, propylene carbonate, and the like.

Examples of the additive include decomposition promoters, adhesion promoters, surfactants, plasticizers, storage stabilizers, defoaming agents, and the like.

Further, the aliphatic polycarbonate according to the present disclosure or the polycarbonate crosslinking agent composition can be used as a dispersant for uniformly dispersing an inorganic material.

Examples of the inorganic material include metal particles made of, for example, gold, silver, copper, iron, nickel, palladium, platinum, aluminum, tungsten, and alloys thereof; glass powders made of, for example, silicon oxides, such as $CaO-Al_2O_3-SiO_2$ system, $MgO-Al_2O_3-SiO_2$ system, and $LiO_2-Al_2O_3-SiO_2$ system; powders of, for example, bismuth oxide glass, silicate glass, lead glass, zinc glass, and boron glass; ceramic powders of, for example, alumina, zirconia, ceria, titanium oxide, barium titanate, aluminum nitride, silicon nitride, boron nitride, and silicon carbide; carbon materials, such as carbon black, graphitic carbon, fullerenes, carbon nanotubes, and nanodiamonds; and the like.

The aliphatic polycarbonate according to the present disclosure or the polycarbonate crosslinking agent composition, and an inorganic material, and further, if necessary, a solvent and other additives can be dispersed by a known method, such as ball milling or bead milling, to obtain a uniform composition (e.g., preferably a slurry).

In the present specification, the term "comprising" includes "consisting essentially of" and "consisting of." Further, the present disclosure includes all of any combinations of the constituent requirements described in the present specification.

In addition, the various characteristics (properties, structures, functions, etc.) described in each embodiment of the present disclosure described above may be combined in any way in specifying the subjects included in the present disclosure. In other words, the present disclosure includes all of the subjects comprising all combinations of the combinable characteristics described in the present specification.

EXAMPLES

Examples are given below to illustrate the present disclosure in more detail; however, the present disclosure is not limited to these Examples. The physical properties of aliphatic polycarbonates were measured by the following methods.

Amount (Content) of Constituent Unit Represented by Formula (1) Contained in Aliphatic Polycarbonate The amount-(content) was measured in the following manner according to a method described in JIS K 2501; 2003.

2.0 g of a sample (aliphatic polycarbonate) was dissolved in 40.0 g of a tetrahydrofuran/water solution (tetrahydrofuran/water=10/1 (wt/wt)), and the resulting solution was subjected to neutralization titration with a 0.1 mol/L sodium hydroxide aqueous solution. The content of the constituent unit represented by formula (1) in the resin was calculated from the amount of sodium hydroxide aqueous solution required and the amount of sodium hydroxide aqueous solution required for a blank test (measurement using a solution containing no aliphatic polycarbonate). More specifically, the following equation holds, where F1 and F2 are the molecular weights of the constituent units of formula (1) and formula (2), respectively; a (mol %) is the content of the constituent unit represented by formula (1); V1 (mL) is the amount of sodium hydroxide aqueous solution required for dropwise addition; and V2 (mL) is the amount of sodium hydroxide aqueous solution required for the blank test. Thus, the content of the constituent unit represented by formula (1), i.e., "a," was calculated by substituting the titration results into the equation.

$$\frac{\text{Mass of sample (aliphatic polycarbonate) used}}{F1 \times a + F2 \times (100 - a)} \times a = \frac{\text{Concentration of sodium hydroxide aqueous solution} \times (V1 - V2)}{1000}$$

Mass Average Molecular Weight (Mw) of Aliphatic Polycarbonate

An N,N-dimethylformamide solution having an aliphatic polycarbonate concentration of 0.2 mass % was prepared, and subjected to a measurement using high-performance liquid chromatography (HPLC). After measurement, the mass average molecular weight was determined by comparison with polystyrene with known mass average molecular weight measured under the same conditions.

The measurement conditions were as follows:
Column: GPC column (trade name: Shodex OHpak SB-804, SB-805, produced by Showa Denko K.K.)
Column temperature: 40° C.
Eluent: 5 mmol/L LiBr—N,N-dimethylformamide solution
Flow rate: 1.0 mL/min Thermal Decomposition-Behavior of Aliphatic Polycarbonate The thermal decomposition behavior was measured by a TG/DTA6200 (produced by Hitachi High-Tech Corporation) while increasing the temperature from room temperature to 500° C. at a heating rate of 10° C./min in a nitrogen atmosphere, to obtain a thermogravimetric curve and a differential thermal curve. The thermal decomposition-starting temperature is indicated by the intersection of a line drawn parallel to the abscissa at the mass before the initiation of a heating test in the thermogravimetric curve, and a tangent line drawn so that an incline between the inflection points in the thermogravimetric curve is at its maximum. The presence or absence of an exothermic peak in the decomposition reaction was determined by the presence or absence of a peak that was convex upward above the baseline in the differential thermal curve (a peak that is convex upward represents an exothermic peak). The amount of residue at 400° C. was calculated from the weight at 400° C. on the thermogravimetric curve.

Production Example 1: Production of Zinc Catalyst

In a 300-mL four-necked flask equipped with a condenser tube, a thermometer, and a stirrer, 6.10 g (0.075 mol) of zinc oxide, 9.50 g (0.15 mol) of glutaric acid, 0.08 g (0.003 mol) of acetic acid, and 160.00 g of toluene were placed. Subsequently, the temperature was increased to 60° C. in a nitrogen atmosphere, and the mixture was reacted by stirring at this temperature for 4 hours. Thereafter, the temperature was increased to 110° C., and the mixture was stirred at this temperature for 4 hours. After removal of water by azeotropic distillation, the reaction mixture was cooled to room temperature to obtain 130.21 g of a catalyst slurry containing a zinc catalyst.

Example 1

Production of Aliphatic Polycarbonate Precursor 1

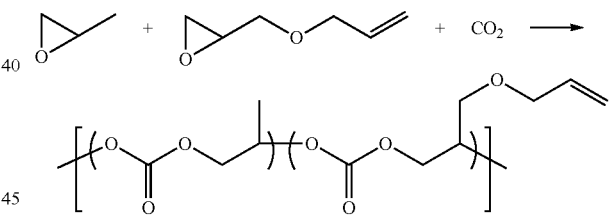

After the internal system of a 1-L autoclave was replaced with a nitrogen atmosphere, 130.21 g of the catalyst slurry obtained in Production Example 1 (containing the zinc catalyst in an amount of 0.075 mol), 614.00 g of hexane, 87.00 g (1.5 mol) of propylene oxide, and 1.14 g (0.010 mol) of allyl glycidyl ether were placed therein. Carbon dioxide was added with stirring until the internal pressure of the reaction system was 1.5 MPa. Thereafter, the temperature was increased to 60° C., and polymerization was performed for 12 hours. After completion of the reaction, the autoclave was depressurized, and the contents were diluted with acetone. After the insoluble matter was filtered, the filtrate was poured into methanol to precipitate a white solid. The obtained white solid was dried under reduced pressure to obtain 125.18 g of aliphatic polycarbonate precursor 1.

The structure of the obtained aliphatic polycarbonate precursor 1 was identified by $^1$H-NMR.

$^1$H-NMR (CDCl$_3$) δ=5.90-5.80 (1H), 5.30-5.15 (2H), 5.06-5.02 (1H), 4.50-4.30 (2H), 4.01-3.99 (2H), 3.65-3.62 (2H), 3.53-3.40 (2H), 1.40-1.30 (3H) ppm.

The obtained aliphatic polycarbonate precursor 1 had a mass average molecular weight of 356,000 and an allyl group content (i.e., content of the precursor unit of the constituent unit of formula (1) in the precursor 1) of 0.70 mol %. This value was calculated from the results of $^1$H-NMR. Specifically, an integral value (A) of the peak near 5.8 ppm, ascribed to the allyl group, and an integral value (B) of the peak near 5.0 ppm, ascribed to the methine hydrogen adjacent to the carbonate group were determined; and a calculation was performed using the following equation.

Allyl group content(mol %)=$A/B$×100

Production of Aliphatic Polycarbonate

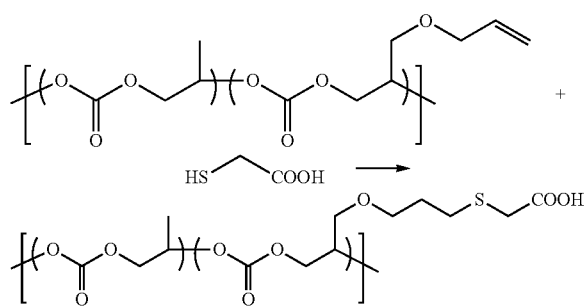

After the inside of a 1-L separable flask equipped with a stirrer, a gas inlet tube, and a thermometer was replaced with nitrogen, 100.00 g of the obtained aliphatic polycarbonate precursor 1, 560.00 g of acetonitrile, 14.34 g of thioglycolic acid, and 1.45 g of 2,2'-azobis(2,4-dimethylvaleronitrile) were placed therein. The temperature was increased to 60° C. with stirring, and the mixture was stirred at this temperature for 4 hours. After the reaction, the reaction solution was poured into methanol to precipitate a polymer. The obtained polymer was dried to obtain 95.12 g of an aliphatic polycarbonate. The obtained aliphatic polycarbonate had a mass average molecular weight of 357100.

The structure of the obtained aliphatic polycarbonate was identified by $^1$H-NMR (FIG. 1).

$^1$H-NMR (CDCl$_3$) δ=5.05-4.95 (1H), 4.51-4.23 (2H), 3.64-3.40 (4H), 3.24 (2H), 2.73 (2H), 1.86 (2H), 1.31 (3H) ppm.

The content of the constituent unit represented by formula (1) in the obtained aliphatic polycarbonate, calculated by neutralization titration, was 0.66 mol %.

Examples 2 to 6

Reactions were performed in the same manner as in Example 1, except that the amounts of propylene oxide and allyl glycidyl ether were changed to the amounts shown in Table 1, thereby obtaining aliphatic polycarbonates.

Comparative Example 1

A reaction was performed in the same manner as in Example 1, except that allyl glycidyl ether was not used, thereby obtaining 130 g of an aliphatic polycarbonate.

Comparative Examples 2 and 3

Reactions were performed in the same manner as in Example 1, except that the amounts of propylene oxide and allyl glycidyl ether were changed to the amounts shown in Table 1, thereby obtaining aliphatic polycarbonates.

Table 1 shows the mass average molecular weights of the aliphatic polycarbonates obtained in the Examples and Comparative Examples, and the content (%) of the constituent unit of formula (1).

Figure 2:
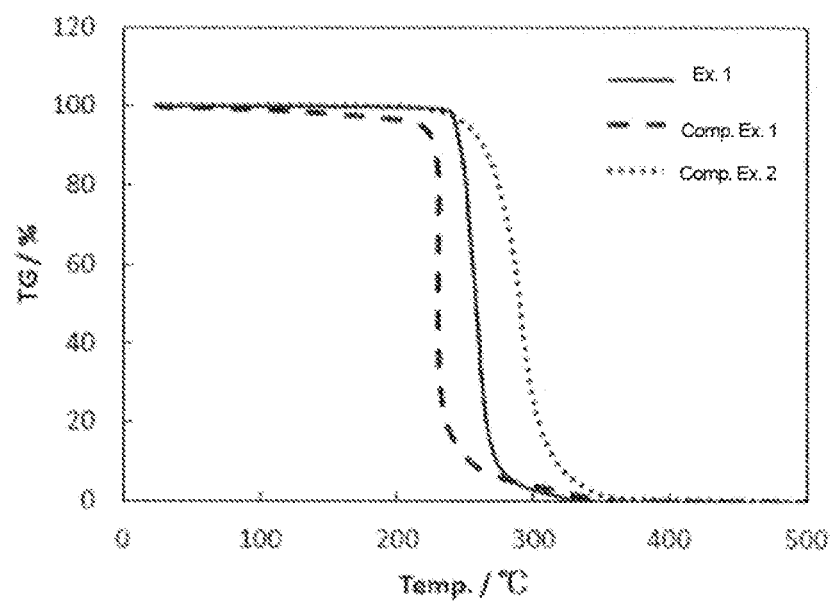
FIG. 2 shows thermogravimetric curves of the aliphatic polycarbonates obtained in Example 1, Comparative Example 1, and Comparative Example 2.
Figure 3:
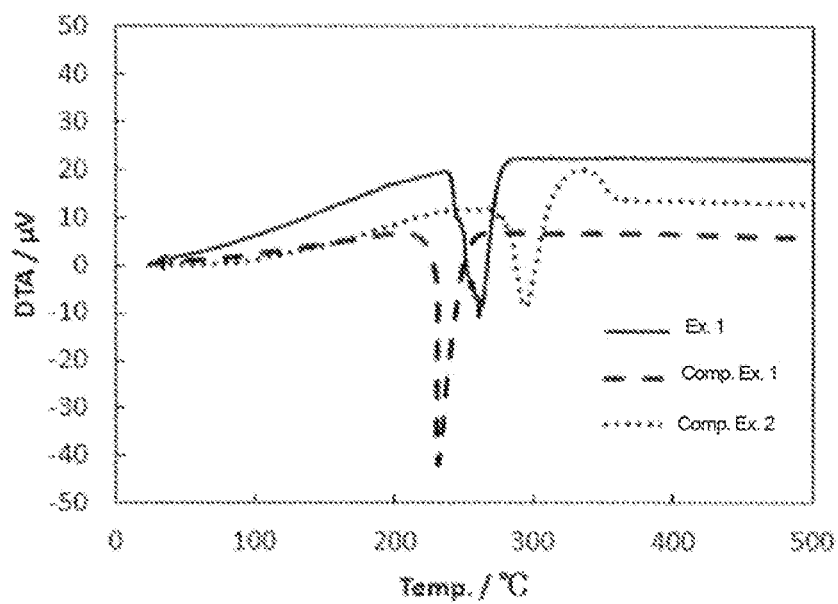
FIG. 3 shows differential thermal curves of the aliphatic polycarbonates obtained in Example 1, Comparative Example 1, and Comparative Example 2.

FIGS. 2 and 3 respectively show the thermogravimetric curves and differential thermal curves of the aliphatic polycarbonates of Example 1, Comparative Example 1, and Comparative Example 2.

TABLE 1

| | raw material epoxide | | Aliphatic polycarbonate | |
|---|---|---|---|---|
| | Propylene oxide | Allyl glycidyl ether | Mw | Content (mol %) of constituent unit of formula (1) |
| Example 1 | 87.00 g (1.5 mol) | 1.14 g (0.010 mol) | 357100 | 0.66 |
| Example 2 | 87.00 g (1.5 mol) | 0.51 g (0.0045 mol) | 434000 | 0.33 |
| Example 3 | 87.00 g (1.5 mol) | 1.73 g (0.015 mol) | 314200 | 1.04 |
| Example 4 | 87.00 g (1.5 mol) | 2.07 g (0.018 mol) | 157600 | 1.42 |
| Example 5 | 87.00 g (1.5 mol) | 0.17 g (0.0012 mol) | 109000 | 0.12 |
| Example 6 | 87.00 g (1.5 mol) | 1.38 g (0.012 mol) | 64700 | 0.80 |
| Comparative Example 1 | 87.00 g (1.5 mol) | — | 330300 | 0 |
| Comparative Example 2 | 87.00 g (1.5 mol) | 3.45 g (0.031 mol) | 285100 | 2.00 |
| Comparative Example 3 | 87.00 g (1.5 mol) | 0.08 g (0.0006 mol) | 114000 | 0.04 |

Example 7

Production of Aliphatic Polycarbonate Precursor 2

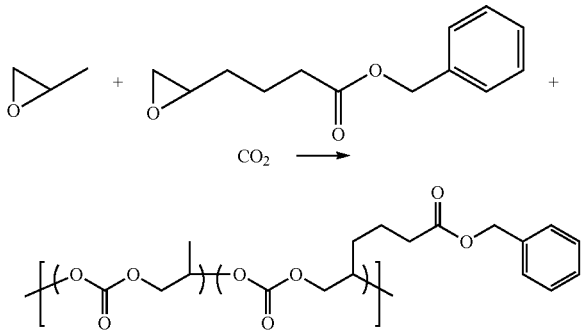

After the internal system of a 1-L autoclave was replaced with a nitrogen atmosphere, 130.21 g of the catalyst slurry (containing the zinc catalyst in an amount of 0.075 mol) obtained in Production Example 1, 614.00 g of hexane, 87.00 g (1.5 mol) of propylene oxide, and 4.74 g (0.023 mol) of benzyl 3-oxiranylbutyrate were placed therein. Carbon dioxide was added with stirring until the internal pressure of the reaction system was 1.5 MPa. Thereafter, the temperature was increased to 60° C., and polymerization was performed for 12 hours. After completion of the reaction, the autoclave was depressurized, and the contents were diluted with acetone. After the insoluble matter was filtered, the filtrate was poured into methanol to precipitate a white solid. The obtained white solid was dried under reduced pressure to obtain 125.18 g of aliphatic polycarbonate precursor 2.

The structure of the obtained aliphatic polycarbonate precursor 2 was identified by $^1$H-NMR.

$^1$H-NMR (CDCl$_3$) δ=7.40-7.20 (5H), 5.10 (2H), 5.06-4.90 (1H), 4.40-4.10 (2H), 2.41-2.33 (2H), 1.70-1.60 (4H), 1.40-1.30 (3H) ppm.

The obtained aliphatic polycarbonate precursor 2 had a mass average molecular weight of 286,000 and a benzyl group content (i.e., content of the constituent unit of formula (1) in the precursor) of 1.48 mol %. This value was calculated from the results of $^1$H-NMR. Specifically, an integral value (C) of the peak near 7.3 ppm, ascribed to the phenyl group, and an integral value (D) of the peak near 1.3 ppm, ascribed to the methyl group were determined; and a calculation was performed using the following equation.

Benzyl group content(mol %)=3×C/(3×C+5×D)×100

Production of Aliphatic Polycarbonate

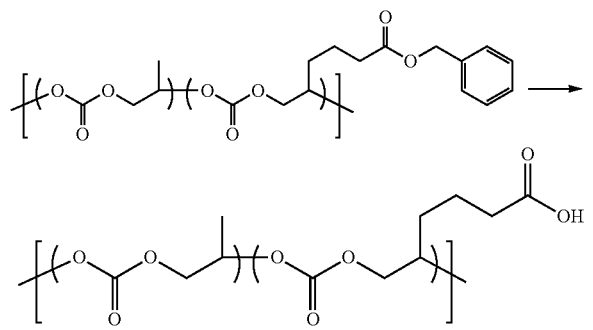

After the inside of a 1-L eggplant flask equipped with a magnetic stirring bar and a gas inlet tube was replaced with nitrogen, 100.00 g of the obtained aliphatic polycarbonate precursor 2, 560.00 g of ethyl acetate, 240.00 g of methanol, and 10.0 g of 5% palladium on carbon were placed therein, followed by freeze-pump-thaw. The inside of the reactor was replaced with a hydrogen atmosphere, and the mixture was stirred at 25° C. for 24 hours while the hydrogen pressure was maintained at 0.1 MPa. After completion of the reaction, the insoluble matter was removed by filtration, and the filtrate was poured into methanol to precipitate a polymer. The obtained polymer was dried to obtain 95.12 g of an aliphatic polycarbonate having a carboxy group in a side chain. The obtained aliphatic polycarbonate had a mass average molecular weight of 197100.

The structure of the obtained aliphatic polycarbonate was identified by $^1$H-NMR.

$^1$H-NMR (CDCl$_3$) δ=5.05-4.95 (1H), 4.51-4.23 (2H), 2.80-2.73 (2H), 1.86-1.65 (4H), 1.31 (3H) ppm.

The content of the constituent unit represented by formula (1) in the obtained aliphatic polycarbonate, calculated by neutralization titration, was 1.48 mol %.

Example 8

After the inside of a 1-L separable flask equipped with a stirrer, a gas inlet tube, and a thermometer was replaced with nitrogen, 100.00 g of the aliphatic polycarbonate obtained in Example 4, 560.00 g of ethyl acetate, and 5.0 g of hexamethylene diisocyanate were placed therein. The temperature was increased to 50° C. with stirring, and the mixture was stirred at this temperature for 1 hour. Thereafter, the reaction solution was dried to obtain 105.0 g of an aliphatic polycarbonate-containing composition containing a crosslinking agent (hexamethylene diisocyanate). By this reaction, a portion of the crosslinking agent was reacted with the aliphatic polycarbonate to obtain a crosslinked aliphatic polycarbonate. The composition was analyzed by HPLC as described above. The results showed that the obtained crosslinked aliphatic polycarbonate had a mass average molecular weight of 317400.

The content of the constituent unit represented by formula (1) in the obtained aliphatic polycarbonate, calculated by neutralization titration, was 1.05 mol % (since the carboxy group in the constituent unit represented by formula (1) was used in the crosslinking reaction for crosslinking, the content of the constituent unit decreased).

Evaluation Example 1: Evaluation as Adhesive Composition

The materials listed in Table 2 were uniformly dissolved in ethyl acetate to obtain adhesive compositions. For example, Evaluation Example 1-a shows that 100 parts of an aliphatic polycarbonate was used in combination with 7 parts of a crosslinking agent. In the table below, "parts" indicates parts by mass. In the Evaluation Example using the aliphatic polycarbonate resin composition of Example 8, no additional crosslinking agent was mixed when preparing an adhesive composition because the composition of Example 8 already contained a crosslinking agent. Each of the obtained adhesive compositions was individually applied to aluminum foil, and then dried at 40° C. for 6 hours to prepare a test piece. The test piece was pressure-bonded to an SUS304 plate at 130° C. and a pressure of 5.0 MPa for 1 minute, left for 24 hours, and then subjected to a 180° peel test at a tension rate of 100 mm/min according to JIS K 6854-2:1999. Table 2 shows the evaluation results.

TABLE 2

| Evaluation Example | Aliphatic Polycarbonate | Parts | Crosslinking agent | Parts | Peel strength (N/25 mm) |
|---|---|---|---|---|---|
| 1-a | Example 1 | 100 | Ethylene glycol diglycidyl ether | 7 | 24.5 |
| 1-b | Example 2 | 100 | Hexamethylene diisocyanate | 5 | 20.4 |
| 1-c | Example 3 | 100 | Ethylene glycol diglycidyl ether | 10 | 25.6 |
| 1-d | Example 4 | 100 | Ethylene glycol diglycidyl ether | 17 | 26.1 |
| 1-e | Example 5 | 100 | Ethylene glycol diglycidyl ether | 2 | 19.4 |
| 1-f | Example 6 | 100 | Diphenylmethane diisocyanate | 10 | 15.4 |
| 1-g | Example 7 | 100 | Diphenylmethane diisocyanate | 10 | 22.5 |
| 1-h | Example 8 | 100 | Hexamethylene diisocyanate | 5 | 27.6 |
| 1-i | Comparative Example 1 | 100 | Ethylene glycol diglycidyl | 7 | 1.0 |

TABLE 2-continued

| Evaluation Example | Aliphatic Polycarbonate | Parts | Crosslinking agent | Parts | Peel strength (N/25 mm) |
|---|---|---|---|---|---|
| 1-j | Comparative Example 2 | 100 | Ethylene glycol diglycidyl ether | 20 | 24.5 |
| 1-k | Comparative Example 3 | 100 | Ethylene glycol diglycidyl ether | 7 | 5.2 |

As shown in Table 2, the compositions each containing the aliphatic polycarbonate of each individual Example and a crosslinking agent showed excellent adhesion.

Evaluation Example 2: Evaluation as Ink Composition

The materials listed in Table 3 were added to phenoxyethanol, followed by stirring at 500 rpm for 1 hour, thereby obtaining ink compositions. Each of the obtained ink compositions was individually placed in a 15-cm settling tube, and stored at 40° C. for 7 days. After 1 day or 7 days of storage, the turbidity of the portion 2 cm below the liquid surface was visually checked to evaluate the settleability. The case in which there was no change from the initial stage was evaluated as A, the case in which the liquid was slightly thinned to the extent that the change could not be recognized without a side-by-side comparison with the initial state was evaluated as B, the case in which the liquid was clearly thinned was evaluated as C, and the case in which no turbidity was observed as a result of complete settling was evaluated as D.

TABLE 3

| | | | | | | | Settleability | |
|---|---|---|---|---|---|---|---|---|
| Evaluation Example | Aliphatic Polycarbonate | Parts | Pigment | Parts | Dispersant | Parts | After 1 day | After 7 days |
| 2-a | Example 1 | 30 | Zinc oxide | 65 | Polyvinyl butyral | 5 | A | A |
| 2-b | Example 2 | 30 | Zinc oxide | 65 | Polyvinyl butyral | 5 | A | A |
| 2-c | Example 3 | 30 | Zinc oxide | 63 | Polyvinyl butyral | 7 | A | B |
| 2-d | Example 4 | 30 | Alumina | 65 | Polyvinyl butyral | 5 | A | A |
| 2-e | Example 5 | 35 | Alumina | 55 | Polyethylene glycol | 10 | A | B |
| 2-f | Example 6 | 40 | Zinc oxide | 55 | Polyvinylpyrrolidone | 5 | A | B |
| 2-g | Example 7 | 35 | Alumina | 60 | Ammonium polyacrylate | 5 | A | B |
| 2-h | Example 8 | 35 | Zinc oxide | 65 | Polyvinylpyrrolidone | 5 | A | A |
| 2-i | Comparative Example 1 | 30 | Zinc oxide | 65 | Polyvinyl butyral | 5 | A | C |
| 2-j | Comparative Example 2 | 30 | Zinc oxide | 65 | Polyvinyl butyral | 5 | B | D |
| 2-k | Comparative Example 3 | 30 | Zinc oxide | 65 | Polyvinyl butyral | 5 | A | C |

As shown in Table 3, when each of the aliphatic polycarbonates of the Examples was individually used, the ink compositions showed excellent settling stability.

Evaluation Example 3: Evaluation as Coating Composition

The materials listed in Table 4 were added to methyl ethyl ketone, and dissolved uniformly to obtain coating compositions. Each coating composition was individually applied to a degreased glass substrate using an applicator. Thereafter, the composition was dried at 60° C. for 5 hours, and further heated at 180° C. for 5 hours to prepare a glass substrate with a coating film. Adhesion to the substrate was evaluated according to JIS K 5600-5-6:1999. The case in which no peeling was observed was evaluated as A, the case in which less than 15% of the coating film was peeled was evaluated as B, and the case in which 15% or more of the coating film was peeled was evaluated as C.

TABLE 4

| Evaluation Example | Aliphatic Polycarbonate | Parts | Monomer | Parts | Curing agent | Parts | Adhesion to substrate |
|---|---|---|---|---|---|---|---|
| 3-a | Example 1 | 20 | Bisphenol A diglycidyl ether | 50 | Methyltetrahydrophthalic anhydride | 50 | B |
| 3-b | Example 2 | 20 | Bisphenol A diglycidyl ether | 50 | Methyltetrahydrophthalic anhydride | 50 | A |
| 3-c | Example 3 | 10 | Bisphenol A diglycidyl ether | 50 | Metaphenylenediamine | 50 | A |
| 3-d | Example 4 | 10 | Bisphenol A diglycidyl ether | 50 | Methyltetrahydrophthalic anhydride | 50 | A |
| 3-e | Example 5 | 10 | Bisphenol F diglycidyl ether | 50 | Methyltetrahydrophthalic anhydride | 50 | A |
| 3-f | Example 6 | 10 | Bisphenol F diglycidyl ether | 50 | Methyltetrahydrophthalic anhydride | 50 | A |
| 3-g | Example 7 | 15 | Bisphenol A diglycidyl ether | 50 | Methyltetrahydrophthalic anhydride | 50 | B |
| 3-h | Example 8 | 20 | Bisphenol A diglycidyl ether | 50 | Metaphenylenediamine | 50 | A |
| 3-i | Comparative Example 1 | 20 | Bisphenol A diglycidyl ether | 50 | Methyltetrahydrophthalic anhydride | 50 | C |
| 3-j | Comparative Example 2 | 20 | Bisphenol A diglycidyl ether | 50 | Methyltetrahydrophthalic anhydride | 50 | B |
| 3-k | Comparative Example 3 | 20 | Bisphenol A diglycidyl ether | 50 | Methyltetrahydrophthalic anhydride | 50 | C |

As shown in Table 4, when each of the aliphatic polycarbonates of the Examples was individually used, coating compositions showing excellent adhesion to the substrate were obtained.

Evaluation Example 4: Evaluation as Binder Resin 100 parts of barium titanate and 15 parts of an aliphatic polycarbonate were added to methyl ethyl ketone, followed by dispersing using a ball mill. The mixture was then formed into a sheet using an applicator, and the solvent was dried at 60° C. The density of the obtained sheet was determined from the dimensions and weight of the sheet. Further, the volumes of the barium titanate and aliphatic polycarbonate used were calculated from the weights and specific gravities of the barium titanate and aliphatic polycarbonate to determine the theoretical density of the sheet, and the porosity of the sheet was determined from the following calculation.

Porosity (%)=(1−measured sheet density/theoretical density of sheet)×100

Theoretical density of sheet=(weight of barium titanate+weight of aliphatic polycarbonate)/(volume of barium titanate+volume of aliphatic polycarbonate)

The case in which the porosity was 0% or more and less than 10% was evaluated as A, the case in which the porosity was 10% or more and less than 20% was evaluated as B, and the case in which the porosity was 20% or more was evaluated as C.

In addition, thermal decomposition measurement of the aliphatic polycarbonates used for the evaluation was performed to evaluate the thermal decomposition starting temperature, the amount of residue at 400° C., and the presence or absence of an exothermic peak in the decomposition reaction.

TABLE 5

| Evaluation Example | Aliphatic Polycarbonate | Porosity | Thermal decomposition starting temperature (° C.) | Amount of residue at 400° C. (%) | Exothermic peak |
|---|---|---|---|---|---|
| 4-a | Example 1 | A | 258.5 | 0.5 | Absent |
| 4-b | Example 2 | A | 257.5 | 0.4 | Absent |
| 4-c | Example 3 | A | 260.1 | 0.7 | Absent |
| 4-d | Example 4 | A | 244.5 | 0.8 | Absent |
| 4-e | Example 5 | A | 234.1 | 0.3 | Absent |
| 4-f | Example 6 | A | 233.5 | 0.6 | Absent |

TABLE 5-continued

| Evaluation Example | Aliphatic Poly-carbonate | Porosity | Thermal decomposition starting temperature (° C.) | Amount of residue at 400° C. (%) | Exothermic peak |
|---|---|---|---|---|---|
| 4-g | Example 7 | A | 254.4 | 0.6 | Absent |
| 4-h | Comparative Example 1 | B | 220.4 | 0.1 | Absent |
| 4-i | Comparative Example 2 | C | 260.5 | 1.1 | Present |
| 4-j | Comparative Example 3 | B | 235.3 | 0.2 | Absent |

As shown in Table 5, by individually using each of the aliphatic polycarbonates of the Examples, sheets denser than those obtained by using conventional aliphatic polycarbonates were obtained. Further, the aliphatic polycarbonates of the Examples exhibited thermal decomposition properties equivalent to those of conventional aliphatic polycarbonates. These results confirmed that the aliphatic polycarbonate of each Example (or a composition containing the aliphatic polycarbonate) is useful as a binder for sintering.

Evaluation Example 5: Evaluation as Dispersant 100 parts of barium titanate and 5 parts of an aliphatic polycarbonate were added to methyl ethyl ketone, followed by dispersing using a ball mill. The change in the particle size distribution before and after dispersion was measured using a SALD=7100 laser diffraction particle size distribution analyzer, produced by Shimadzu Corporation. The case in which the particle size distribution became narrower than that of barium titanate, which is a starting material, was evaluated as A; the case in which there was almost no change in the particle size distribution was evaluated as B; and the case in which the particle size distribution became wider, and obvious agglomeration was observed, was evaluated as C.

TABLE 6

| Evaluation Example | Aliphatic Polycarbonate | Dispersibility |
|---|---|---|
| 5-a | Example 1 | A |
| 5-b | Example 2 | A |
| 5-c | Example 3 | A |
| 5-d | Example 4 | A |
| 5-e | Example 5 | A |
| 5-f | Example 6 | A |
| 5-g | Example 7 | A |
| 5-h | Comparative Example 1 | B |
| 5-i | Comparative Example 2 | C |
| 5-j | Comparative Example 3 | B |

As shown in Table 6, it was confirmed that when the aliphatic polycarbonate of each Example was used as a dispersant, excellent dispersibility was exhibited.

INDUSTRIAL APPLICABILITY

The aliphatic polycarbonate according to the present disclosure, which further has useful functions in addition to the functions of conventional aliphatic polycarbonates, can be used in a wider range of applications.

The invention claimed is:

1. An aliphatic polycarbonate comprising a constituent unit represented by formula (1):

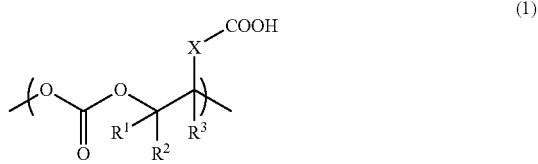

wherein $R^1$, $R^2$, and $R^3$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^1$ to $R^3$, taken together with the carbon atom or carbon atoms to which these groups are attached, may form a substituted or unsubstituted, saturated or unsaturated 3- to 10-membered aliphatic ring; and X represents a divalent group containing one or more heteroatoms or an alkylene group having 3 or more carbon atoms, and a constituent unit represented by formula (2):

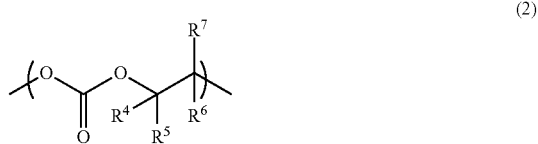

wherein $R^4$, $R^5$, $R^6$, and $R^7$ are identical or different, and each represents a hydrogen atom, a $C_{1-10}$ alkyl group optionally substituted with one or more substituents, or a $C_{6-20}$ aryl group optionally substituted with one or more substituents, wherein two groups from among $R^4$ to $R^7$, taken together with the carbon atom or carbon atoms to which these groups are attached, may form a substituted or unsubstituted, saturated or unsaturated 3- to 10-membered aliphatic ring, the content of the constituent unit represented by formula (1) being 0.1 mol % or more and 1.5 mol % or less, based on the total amount of the constituent units of formula (1) and formula (2).

2. The aliphatic polycarbonate according to claim 1, which has a mass average molecular weight of 60000 or more and 1000000 or less.

3. The aliphatic polycarbonate according to claim 1, wherein the divalent group containing one or more heteroatoms represented by X in formula (1) is a group containing at least one atom selected from the group consisting of an oxygen atom, a nitrogen atom, and a sulfur atom.

4. The aliphatic polycarbonate according to claim 1, wherein the divalent group containing one or more heteroatoms represented by X in formula (1) is a group represented by formula (a):

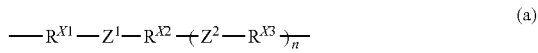

wherein $R^{X1}$, $R^{X2}$, and $R^{X3}$ are identical or different, and each represents a single bond, a $C_{1-6}$ linear or branched alkylene group, or —$C_6H_4$—; $Z^1$ and $Z^2$ are identical or different, and each represents an ether linkage, an ester linkage, an amino linkage, an amide linkage, a sulfide linkage, or a thioester linkage; and n represents 0 or 1.

5. The aliphatic polycarbonate according to claim 1, which consists of the constituent unit represented by formula (1) and the constituent unit represented by formula (2).

6. An aliphatic polycarbonate composition comprising the aliphatic polycarbonate according to claim 1 and a cross-linking agent.

7. An adhesive composition obtained by using the aliphatic polycarbonate according to claim 1.

8. An ink composition comprising the aliphatic polycarbonate according to claim 1.

9. A coating composition comprising the aliphatic polycarbonate according to claim 1.

10. A binder for sintering, comprising the aliphatic polycarbonate according to claim 1.

11. A dispersant comprising the aliphatic polycarbonate according to claim 1.

12. An adhesive composition obtained by using the aliphatic polycarbonate according to the aliphatic polycarbonate composition according to claim 6.

13. An ink composition comprising the aliphatic polycarbonate according the aliphatic polycarbonate composition according to claim 6.

14. A coating composition comprising the aliphatic polycarbonate according to the aliphatic polycarbonate composition according to claim 6.

15. A binder for sintering, comprising the aliphatic polycarbonate according to the aliphatic polycarbonate composition according to claim 6.

16. A dispersant comprising the aliphatic polycarbonate according to the aliphatic polycarbonate composition according to claim 6.

* * * * *